(12) United States Patent
Teixeira et al.

(10) Patent No.: US 10,562,578 B2
(45) Date of Patent: Feb. 18, 2020

(54) ADJUSTABLE SADDLE POST SYSTEM

(71) Applicant: Specialized Bicycle Components, Inc., Morgan Hill, CA (US)

(72) Inventors: Chuck Teixeira, Santa Cruz, CA (US); Brian D. Robinson, Morgan Hill, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 800 days.

(21) Appl. No.: 15/097,667

(22) Filed: Apr. 13, 2016

(65) Prior Publication Data

US 2016/0304146 A1 Oct. 20, 2016

Related U.S. Application Data

(60) Provisional application No. 62/147,984, filed on Apr. 15, 2015.

(51) Int. Cl.
*B62J 1/08* (2006.01)
*B62J 1/06* (2006.01)

(52) U.S. Cl.
CPC . *B62J 1/08* (2013.01); *B62J 1/06* (2013.01); *B62J 2001/085* (2013.01)

(58) Field of Classification Search
CPC .......... B62J 1/06; B62J 1/08; B62J 2001/085; B62K 19/36; B62K 23/06;
(Continued)

(56) References Cited

U.S. PATENT DOCUMENTS 4,563,939 A * 1/1986 Siegrist .................. B22D 17/32
137/596.17
4,951,552 A * 8/1990 Fox ...................... F15B 15/261
91/45

(Continued)

FOREIGN PATENT DOCUMENTS

FR 2702809 9/1994
JP 2005231567 9/2005
JP 2005262900 9/2005

OTHER PUBLICATIONS

CutleryLover, "Explaining How OTF Automatic Knives Work (OTF=Out the Front)," https://www.youtube.com/watch?v=8dtJkpgn6SU&t=31s published Jul. 31, 2016.

(Continued)

*Primary Examiner* — F Daniel Lopez
(74) *Attorney, Agent, or Firm* — Knobbe Martens Olsen & Bear LLP

(57) ABSTRACT

An adjustable length post for a bicycle comprises first and second slidably coupled supports, the second support comprising an interior cavity defined by an interior surface, the interior surface having a portion recessed from a surrounding surface; and a collet coupled to or integrated into the first support, the collet comprising a body positioned at least partially within the interior cavity of the second support; a locking member pivotally or slidably coupled to the body, the locking member repositionable between a locked configuration and an unlocked configuration, wherein, in the locked configuration, the locking member protrudes laterally from the body an amount sufficient to engage the recessed portion of the interior surface of the second support, and, in the unlocked configuration, the locking member does not protrude laterally from the body or does not protrude an amount sufficient to engage the recessed portion of the interior surface of the second support.

29 Claims, 11 Drawing Sheets

(58) Field of Classification Search
CPC ........ B62K 2025/045; B62K 2025/048; F15B 1/024; F15B 21/04; F16B 7/105; Y10T 403/76; Y10T 403/32467; Y10T 403/32475; Y10T 403/32524; Y10T 403/32516

See application file for complete search history.

(56) References Cited

U.S. PATENT DOCUMENTS

| | | | |
|---|---|---|---|
| 5,324,058 A | 6/1994 | Massaro | |
| 5,366,275 A | 11/1994 | Sulzer | |
| 5,429,217 A * | 7/1995 | Stringer | A47C 1/0244 188/300 |
| 5,431,085 A * | 7/1995 | Geffray | F02K 1/766 91/44 |
| 6,050,585 A | 4/2000 | Rai | |
| 6,159,119 A | 12/2000 | Nakamura et al. | |
| 7,422,224 B2 | 9/2008 | Sicz et al. | |
| 8,016,349 B2 | 9/2011 | Mouri et al. | |
| 8,038,208 B2 | 10/2011 | Mankadi | |
| 8,056,309 B2 * | 11/2011 | Vandendriessche | A01F 29/10 56/16.4 B |
| 8,246,065 B1 | 8/2012 | Kodama et al. | |
| 8,317,261 B2 | 11/2012 | Walsh | |
| 8,550,551 B2 | 10/2013 | Shirai | |
| 8,752,893 B2 | 6/2014 | Chien et al. | |
| 8,814,109 B2 | 8/2014 | Laird et al. | |
| 8,833,786 B2 | 9/2014 | Camp et al. | |
| 8,833,848 B2 | 9/2014 | Shirai | |
| 9,242,688 B2 | 1/2016 | McAndrews et al. | |
| 9,272,745 B2 | 3/2016 | Camp et al. | |
| 9,415,824 B2 | 8/2016 | Maier | |
| 2004/0079224 A1 * | 4/2004 | Bernhardt | A01B 63/1006 91/525 |
| 2006/0175792 A1 | 8/2006 | Sicz et al. | |
| 2008/0127770 A1 | 6/2008 | Morelli | |
| 2012/0006949 A1 | 1/2012 | Laird et al. | |
| 2012/0180470 A1 * | 7/2012 | Schroeder | E02F 9/2217 60/414 |
| 2012/0228906 A1 | 9/2012 | McAndrews et al. | |
| 2015/0034779 A1 | 2/2015 | McAndrews et al. | |
| 2016/0304146 A1 | 10/2016 | Teixeira et al. | |

OTHER PUBLICATIONS

European Patent Office Action for Application No. 17208135.8 dated Apr. 26, 2019 (4 pages).
European Patent Office Action for Application No. 17208135.8 dated May 3, 2018 (6 pages).
Mechanisms, "Reciprocate Gear," https://www.youtube.com/watch?v=Sk8oqLw12Tw published Apr. 24, 2018.
U.S. Appl. No. 15/787,271, filed Oct. 18, 2017, by Teixeira et al.

* cited by examiner

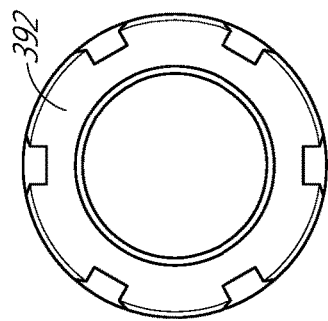
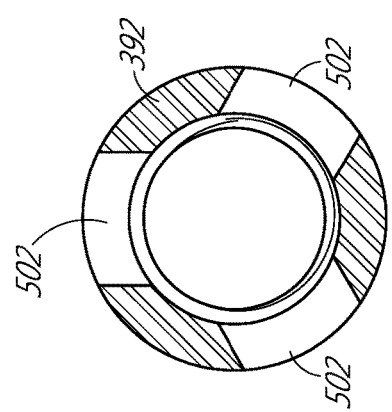
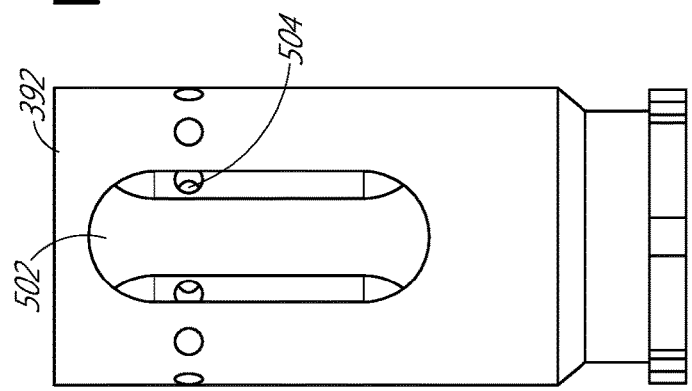
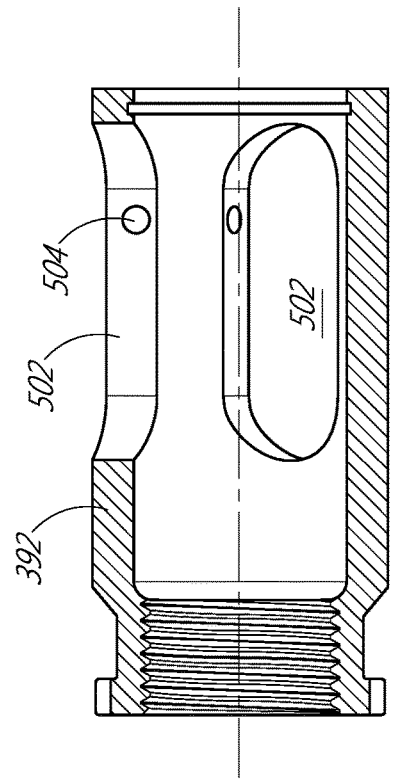
FIG. 5A
FIG. 5B
FIG. 5C
FIG. 5D

ADJUSTABLE SADDLE POST SYSTEM

CROSS-REFERENCE TO RELATED APPLICATIONS

This application claims the benefit of U.S. Provisional Application No. 62/147,984, filed Apr. 15, 2015, which is hereby incorporated by reference herein in its entirety.

TECHNICAL FIELD

The present technology relates to bicycles and, in particular, adjustable saddle post systems.

DESCRIPTION OF THE RELATED TECHNOLOGY

In certain situations, it may be desirable for a cyclist to selectively raise or lower a saddle while he or she is riding a bicycle. For example, it may be advantageous to lower the saddle when going downhill. Further, it may be advantageous to raise the saddle when climbing a hill. The height of the bicycle saddle may be important in determining a rider's power efficiency.

SUMMARY

The systems, methods, and devices described herein have innovative aspects, no single one of which is indispensable or solely responsible for their desirable attributes. Without limiting the scope of the claims, some of the advantageous features will now be summarized.

One aspect of one embodiment is that it may be desirable for a cyclist to change the height of a saddle while he or she is riding a bicycle. For example, it may be advantageous to have the saddle in a raised position, engaged with the rider, while traversing relatively flat terrain, and to have the saddle in a lowered position, not engaged with the rider, while traversing relatively steep terrain.

In some embodiments, it may be desirable to actively raise and/or lower a saddle post by using a stored power source, without requiring that an external force be applied to the saddle post. Such a configuration can be desirable, for example, because it can enable a cyclist to focus more of his or her attention and physical movements on navigating technical terrain. Further, in addition to actively moving the saddle, it can be desirable in some embodiments to relatively rapidly move the saddle up or down. This can be desirable, for example, because the less time it takes to lower the saddle or move the saddle out of the way of the rider, the quicker the rider can position himself or herself into an optimum riding position for the present terrain. Various embodiments disclosed herein incorporate one or more features that help to enable these benefits.

In some embodiments, it may be desirable to minimize or limit the friction generated between an upper support and a lower support of a saddle post when a saddle height is being changed (and/or to increase or maximize the smoothness of such motion). Limiting or minimizing such friction may be desirable, for example, because the saddle height may be able to be adjusted more quickly than if the friction were higher and/or less stored energy may be required to cause motion of the saddle upward or downward. Accordingly, various embodiments disclosed herein comprise a locking mechanism, such as a collet, that is configured to selectively lock the saddle post in a particular position, but to provide relatively little resistance to compression or extension of the saddle post, and/or to not detrimentally affect the smoothness of such compression or extension, when the locking mechanism is in an unlocked state.

According to some embodiments, a preferably low-friction adjustable length post for a bicycle comprises: first and second slidably coupled supports, the second support comprising an interior cavity defined by an interior surface, the interior surface having a portion recessed from a surrounding surface, such as a groove; and a collet coupled to or integrated into the first support, the collet comprising: a body positioned at least partially within the interior cavity of the second support; a locking member pivotally or slidably coupled to the body, the locking member repositionable between a locked configuration and an unlocked configuration, wherein, in the locked configuration, the locking member protrudes laterally from the body an amount sufficient to engage the recessed portion of the interior surface of the second support, and, in the unlocked configuration, the locking member does not protrude laterally from the body or does not protrude an amount sufficient to engage the recessed portion of the interior surface of the second support; and an actuating member positionable to engage an inner surface of the locking member to selectively retain the locking member in the locked configuration.

In some embodiments, the adjustable length post further comprises: a piston coupled to the second support and configured to cause sliding of the second support with respect to the first support, wherein the piston is compliantly coupled to the second support, such that, when the second support is in a fully extended position with respect to the first support, movement of the piston with respect to the first support and second support causes the actuating member of the collet to retain the locking member in the locked configuration. In some embodiments, the piston is configured to cause sliding of the second support with respect to the first support by at least one of a hydraulic pressure differential, a pneumatic pressure differential, and a mechanical spring force. In some embodiments, the collet comprises a plurality of locking members pivotally or slidably coupled to the body, the plurality of locking members desirably positioned circumferentially around the body of the collet. In some embodiments, the locking member comprises an at least partially annular convex surface shaped to engage an annular concave surface of the recessed portion. In some embodiments, the locking member comprises an arm pivotally coupled to the body at a proximal end of the arm, the at least partially annular convex surface located at a distal end of the arm. In some embodiments, the actuating member is further configured to selectively retain the locking member in the unlocked configuration. In some embodiments, the recessed portion of the interior surface of the second support is positioned to enable locking of the second support with respect to the first support in a fully extended position, and wherein the interior surface further comprises a second recessed portion positioned to enable locking of the second support with respect to the first support in a fully retracted position. In some embodiments, one of the first and second supports is configured to attach to a bicycle frame, and the other of the first and second supports is configured to attach to a bicycle saddle.

According to some embodiments, an active adjustable height saddle system for a bicycle comprises: first and second slidably coupled supports, the first support configured to attach to a bicycle frame or integrated into the bicycle frame, the second support configured to attach to a bicycle saddle; a fluid-powered linear actuator comprising first and second fluid chambers separated by a piston, wherein the piston is coupled to one of the first and second supports such that movement of the piston with respect to the other of the first and second supports causes the second support to slide with respect to the first support; and a control valve fluidly coupled to at least one of the first and second fluid chambers, the control valve configured to selectively enable pressurized fluid to flow from a pressurized fluid source into at least one of the first and second fluid chambers to create a pressure differential between the first and second fluid chambers that causes the movement of the piston.

In some embodiments, the fluid-powered linear actuator is a pneumatic cylinder. In some embodiments, the fluid-powered linear actuator is a hydraulic cylinder. In some embodiments, the fluid-powered linear actuator is positioned substantially within the first or second support. In some embodiments, the fluid-powered linear actuator is positioned substantially external to the first and second support. In some embodiments, the piston of the fluid-powered linear actuator seals against an inner surface of the first or second support to separate the first and second fluid chambers. In some embodiments, the control valve is configured to enable fluid-powered sliding of the second support in an extension direction with respect to the first support. In some embodiments, the control valve is configured to enable fluid-powered sliding of the second support to a completely extended position with respect to the first support. In some embodiments, the control valve is configured to enable fluid-powered sliding of the second support between a first predetermined position and a second predetermined position. In some embodiments, at least one of the first and second predetermined positions is defined by a user-repositionable stroke-limiting component that limits sliding of the second support with respect to the first support. In some embodiments, the control valve is configured to enable fluid-powered sliding of the second support in a retraction direction with respect to the first support. In some embodiments, the control valve is configured to enable fluid-powered sliding of the second support to a completely retracted position with respect to the first support. In some embodiments, the control valve is configured to enable fluid-powered sliding of the second support in both an extension direction and a retraction direction with respect to the first support. In some embodiments, the control valve is configured to enable pressurized fluid to flow from the pressurized fluid source into the first fluid chamber to enable fluid-powered sliding of the second support in the extension direction, and the control valve is configured to enable pressurized fluid to flow from a second pressurized fluid source into the second fluid chamber to enable fluid-powered sliding of the second support in the retraction direction. In some embodiments, the control valve comprises a three-way valve configured to selectively direct pressurized fluid from a single pressurized fluid source to the first fluid chamber or second fluid chamber. In some embodiments, the control valve is fluidly coupled to the first chamber to enable selective extension of the second support with respect to the first support, and the system further comprises a second control valve fluidly coupled to the second chamber to enable selective retraction of the second support with respect to the first support. In some embodiments, the fluid-powered linear actuator comprises first and second concentric cylindrical bodies, wherein a cavity between the first and second bodies is in fluid communication with the first chamber or second chamber. In some embodiments, the control valve is configured to selectively seal the first and/or second chamber to enable the linear actuator to maintain the second support in a substantially fixed position with respect to the first support. In some embodiments, the system further comprises a mechanical locking mechanism configured to maintain the second support in a predetermined position with respect to the first support. In some embodiments, the locking mechanism is configured to be activated by the piston when the second support is at a fully extended position with respect to the first support. In some embodiments, the locking mechanism comprises a collet having radially expandable arms configured to engage one or more recessed portions, such as grooves, of the first or second support. In some embodiments, the radially expandable arms are pivotally coupled to a body of the collet.

According to some embodiments, an active adjustable height saddle system for a bicycle comprises: first and second slidably coupled supports, the first support configured to attach to a bicycle frame or integrated into the bicycle frame, the second support configured to attach to a bicycle saddle; a fluid-powered linear actuator comprising first and second fluid chambers separated by a piston, wherein the piston is coupled to one of the first and second supports such that movement of the piston with respect to the other of the first and second supports causes the second support to slide with respect to the first support; a collet having radially expandable arms configured to engage one or more recessed portions, such as grooves, of the first or second support to selectively retain the second support in one or more predetermined positions with respect to the first support; and an actuating member configured to selectively expand the collet arms to engage the one or more recessed portions, wherein the piston is compliantly coupled to one of the first and second supports, such that, when the second support is in a fully extended position with respect to the first support, movement of the piston with respect to the first support and second support causes the actuating member to expand the collet arms.

In some embodiments, the radially expandable arms are pivotally coupled to a body of the collet. In some embodiments, the collet comprise a disengaged configuration wherein the arms are retracted in a radial direction sufficiently to not drag against an inner surface of the first or second support when the second support slides with respect to the first support. In some embodiments, the fluid-powered linear actuator is a pneumatic cylinder. In some embodiments, the fluid-powered linear actuator is a hydraulic cylinder. In some embodiments, the system further comprises a first port in fluid communication with the first chamber and a second port in fluid communication with the second chamber, the first and second ports configured to connect to a pressurized fluid supply. In some embodiments, the fluid-powered linear actuator comprises first and second concentric cylindrical bodies, wherein a cavity between the first and second bodies is in fluid communication with the first chamber or second chamber.

According to some embodiments, an adjustable height saddle system for a bicycle comprises: a first support configured to attach to a bicycle frame or integrated into the bicycle frame; and a second support configured to attach to a bicycle saddle, the second support slidably coupled to the first support such that the second support can translate with respect to the first support from a raised position to a lowered position and from the lowered position to the raised position, wherein the second support is configured to translate with respect to the first support from the raised position to the lowered position at a faster rate than from the lowered position to the raised position.

In some embodiments, the system further comprises: a fluid-powered linear actuator comprising first and second fluid chambers separated by a piston, wherein the piston is coupled to one of the first and second supports such that movement of the piston with respect to the other of the first and second supports causes the second support to slide with respect to the first support; and a compressed gas source fluidly coupled to the fluid-powered linear actuator to selectively cause fluid-powered translation of the second support with respect to the first support in at least a direction that causes the second support to move from the raised position to the lowered position. In some embodiments, the system further comprises: one or more damping mechanisms that resist translational motion of the second support with respect to the first support, wherein the one or more damping mechanisms are configured to damp translational motion of the second support with respect to the first support at a higher level when the second support is moving from the lowered position to the raised position than when the second support is moving from the raised position to the lowered position.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements.

FIGS. 5A-5D illustrate various views of an embodiment of a body of a low-friction collet for use with an adjustable height saddle post.

DETAILED DESCRIPTION

Figure 1A:
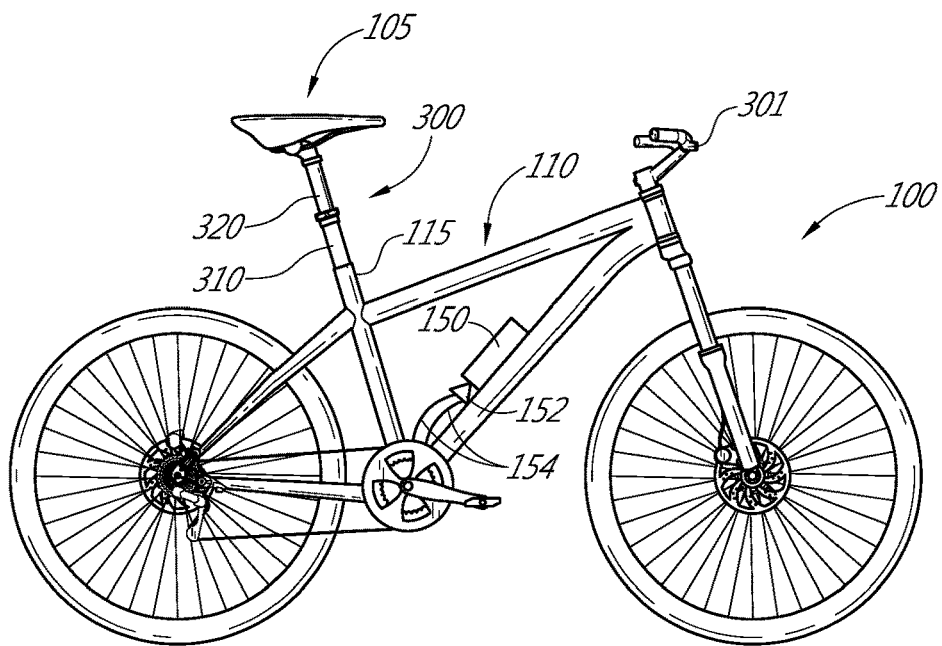
FIG. 1A illustrates a side view of a bicycle including one embodiment of an active adjustable saddle post system in a raised position.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

The disclosure herein present systems, methods, and devices for enabling active and/or automatic raising and/or lowering of a bicycle saddle post or seat post while a rider is riding the bicycle. The disclosure herein also presents systems, methods, and devices for low-friction and/or efficient raising and/or lowering (automatically, actively, and/or manually) of a bicycle saddle post or seat post. It can be desirable for a rider to lower their saddle, disengaging the saddle, so that they can more easily negotiate steep, hazardous, and/or technical terrain. It can also be desirable to raise the seat or saddle back up to a normal riding position so that the rider can continue to peddle in a normal riding position when the terrain is less technical. Further, it can also be desirable to make the transition of the saddle from an upper position to a lower position or vice versa relatively quickly. Particularly when a bicycle rider is riding in technical terrain, the rider needs to remain focused on the terrain and his or her operation of the bicycle to most effectively navigate the terrain and/or to avoid injuring himself or herself. Accordingly, although different portions of the terrain may be more easily navigated with the bicycle saddle in different positions or heights, moving the saddle between those positions may be counterproductive if it takes the rider's concentration away from other riding functions being performed by the rider, and/or if moving the saddle requires the rider to engage and push downward on the saddle (e.g., a squatting motion) when navigation of the present terrain would more desirably have the rider in a more raised position not engaged with the saddle.

With existing adjustable height saddle posts or seat posts, a rider must use his or her body weight to lower the saddle while riding. For example, a saddle post may comprise an air spring that biases the saddle post upward when a control lever is activated. With such a system, a rider can lower the saddle by activating the control lever and using his or her body weight to overcome the biasing force to lower the saddle. When the rider wishes to raise the seat back up, the rider can again activate the control lever, allowing the biasing force from the air spring to raise the seat back up. While adjustable height saddle posts have significant benefits, the squatting motion required by an adjustable height seat post that is lowered by a rider's bodyweight can be undesirable as it can place the rider's body in an awkward position, particularly just prior to a hazard, such as upcoming technical terrain. Further, when a rider is in or approaching technical terrain, a rider may be distracted by needing to reposition his or her body to lower the saddle post. Desirably, when in or approaching technical terrain, a rider should be able to devote as much mental capacity as possible to the task at hand, namely navigating the technical terrain.

Certain embodiments disclosed herein solve these problems by enabling a bicycle saddle or seat to be actively raised and/or lowered, without stopping the bicycle or requiring the rider to push or pull on the saddle, by using a stored energy source, such as a compressed gas cylinder. Such an embodiment can be configured to move an unweighted saddle up or down and out of the way without using a rider's body weight to move the saddle down and/or without requiring an upward pulling from the rider to raise the saddle. Further, use of a stored energy source to actively move the saddle post can result in a relatively fast or quick actuation. For example, compressed gas may be utilized to drop the saddle to a lowered position at a faster rate than would be possible if the saddle were simply allowed to freefall under the pull of gravity. Further, the rate of lowering and/or rising may in some embodiments be adjustable to suit a rider's preference, for example, by adjusting the pressure of compressed fluid utilized in a fluid-powered actuator. Further, some embodiments disclosed herein comprise a low friction locking device or collet design that reduces or limits friction or resistance to movement of the saddle post upward and/or downward, which can help to increase the speed of actuation and/or reduce the amount of stored energy required to move the saddle post. Accordingly, the embodiments disclosed herein allow a rider to approach an obstacle in the rider's best body position, quickly, safely, and efficiently lower the seat, then quickly, safely, and efficiently raise the seat back up when the rider no longer requires the lowered seat.

Figure 1B:
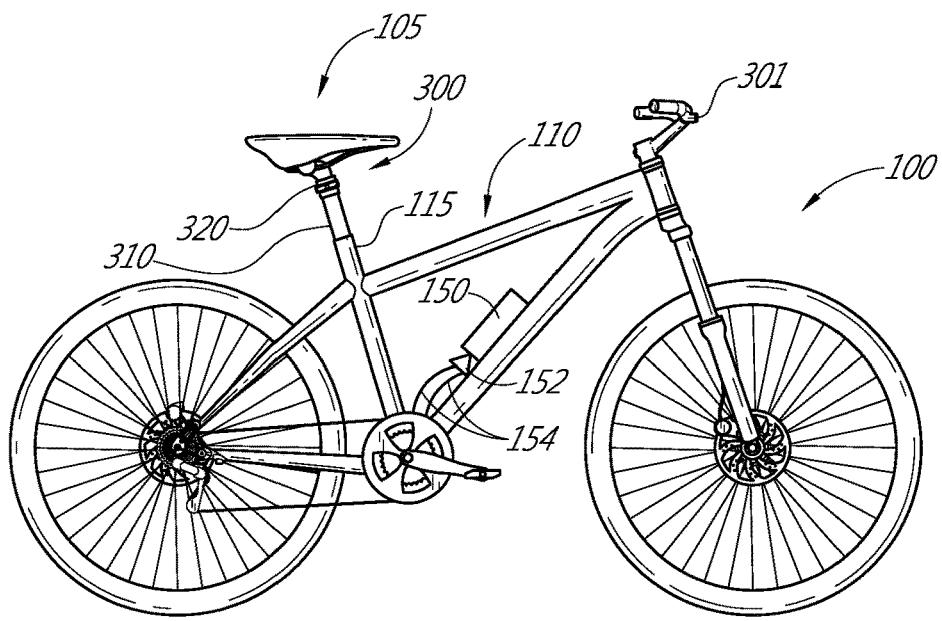
FIG. 1B illustrates a side view of the bicycle of FIG. 1A with the active adjustable saddle post system in a lowered position.

FIGS. 1A and 1B, which will be described in further detail below, illustrate one embodiment of a bicycle 100 comprising an active adjustable height saddle post system. In this embodiment, an adjustable height saddle post 300 is actively controllable by a stored energy device 150, such as, for example, a refillable or single use CO2 cylinder. This embodiment further comprises a control valve 152 desirably connected to the adjustable height saddle post 300 through two control lines 154. The control valve 152 can be configured to selectively allow a pressurized gas to flow from the stored energy device 150 to one or more air cylinder chambers of the adjustable height saddle post 300, causing the saddle post to raise or lower, depending on which control line 154 and/or air cylinder chamber is utilized.

Although the embodiment illustrated in FIGS. 1A and 1B comprises a stored energy device positioned on or next to a bicycle frame 110 (in this case on a downtube of the bicycle frame 110), various embodiments may position the stored energy device or stored energy devices in various locations. For example, the stored energy device may be attached to the frame of the bicycle, integrated into the frame of the bicycle, attached to the adjustable height saddle post, integrated into the adjustable height saddle post, and/or the like. Further, in some embodiments, multiple stored energy devices may be utilized. For example, one stored energy device may be utilized to extend the saddle post, and a second stored energy device may be utilized to retract the saddle post. Such an embodiment may be desirable to reduce complexity of the control valve circuitry. For example, in the embodiment illustrated in FIGS. 1A and 1B, the control valve 152 may be a three way valve that comprises a single inlet port to receive compressed gas from the stored energy device 150, and one or more solenoids or the like functionally connected to fluid flow paths that direct the compressed gas from the inlet port to one of two outlet ports connected to the control lines 154. In a case where separate stored energy devices are utilized for extension and retraction of the saddle post, however, a two way valve (e.g., one inlet port and one outlet port) may be used for each of the two stored energy devices, potentially reducing complexity of the control valve system.

In some embodiments, the active adjustable height saddle post is controlled by a user operatable control (e.g., a manual control). For example, with reference to FIG. 1A, controller 301 located at handlebars of the bicycle may be operatable by a rider. The controller 301 may, for example, be functionally connected to the control valve 152, enabling the control valve 152 to selectively cause a pressurized gas or other fluid to flow from the stored energy device 150 to the adjustable height saddle post 300 (or to a fluid-powered actuator separate from the saddle post). The controller 301 may operate in various ways, such as by a mechanical linkage, such as a cable, between the controller 301 and the control valve 152. In some embodiments, the controller 301 may be electronic, with an electrical signal, wired or wireless, being sent from the controller 301 to the control valve 152 and/or a separate or integrated electronic controller. Further, in some embodiments, the bicycle may comprise a user operatable or manual control positioned elsewhere, such as, for example, on the frame of the bicycle, on or around the saddle 105, on or near the adjustable height saddle post 300, and/or the like. In some embodiments, in lieu of or in addition to one or more manual controls, the active adjustable height saddle post may be caused to raise and/or lower by an automatic operation mechanism. For example, the system may comprise one or more sensors (e.g., accelerometer, vibration sensor, speed sensor, rider presence sensor, and/or the like) that enable an electronic controller to detect when the bicycle is in a situation where raising or lowering of the bicycle saddle would be desirable. When the electronic controller detects such a situation, it can be configured to automatically or dynamically cause the adjustable height saddle post to raise or lower. In some embodiments, such sensors and/or controller may be integrated into the adjustable height saddle post 300, the stored energy device 150, the bicycle frame 110, and/or the like.

Various embodiments disclosed herein utilize a fluid-powered linear actuator to actively extend and/or retract an adjustable height saddle post. As used herein, the word "fluid" may be used to refer to any type of fluid sufficient to perform the functions as described herein, whether the fluid is in a liquid form or gas form. For example, a fluid-powered linear actuator may comprise a pneumatic cylinder or a hydraulic cylinder. Further, particularly in an embodiment utilizing a pneumatic cylinder, the fluid that causes the pneumatic cylinder to actuate may comprise more than one state. For example, the fluid may be in a liquid state when it is in a stored energy device, such as a disposable CO2 cylinder. However, in some embodiments, the fluid may convert to a gas state when it is released from the stored energy device and caused to flow to the pneumatic cylinder of the adjustable height saddle post. Further, various embodiments disclosed herein utilize the term "fluid-powered." The term "fluid-powered" as used herein is a broad term intended to refer to a mechanism or assembly that is configured to generate an output of mechanical motion (such as linear motion, rotational motion, and/or the like) by converting energy of a pressurized fluid into mechanical movement. For example, a fluid-powered hydraulic or pneumatic cylinder comprises a piston that separates two chambers. When fluid is introduced into one of those chambers at a pressure higher than the relative pressure in the other chamber, the piston is caused to slide, thus generating an output of linear motion. Further, the term "active" as used herein in reference to an actively adjustable saddle post is intended to refer to an adjustable height saddle post that is caused to raise and/or lower by an energy source other than the human power of the rider riding the bicycle. For example, as used herein, the term active may refer to an adjustable height saddle post that is caused to raise and/or lower under the power of a compressed gas, a compressed fluid, electricity stored in a battery, and/or the like.

In some embodiments, a fluid-powered actuator comprises an open system, meaning active mechanical output of the actuator requires introduction of new pressurized fluid into one chamber (causing that chamber to increase in volume) and, in some embodiments, expelling or exhausting of fluid from another chamber (due to the another chamber being reduced in volume). Further, in some embodiments, new pressurized fluid introduced into a first chamber causes the first chamber to expand in volume, moving the saddle post in a predetermined direction. When the saddle post moves in the opposite direction, in some embodiment, the pressurized fluid previously introduced into the first chamber is exhausted out of the system and, thus, new pressurized fluid is required to be introduced into the first chamber when the actuation process is to be repeated. Accordingly, in some embodiments, a fluid-powered actuator as disclosed herein is an open system, as opposed to a closed system. An example of a closed system would be a hydraulic assembly having a piston that separates first and second chambers, and a predetermined volume of fluid that passes back and forth between the first and second chambers, such as by bypassing the piston through one or more orifices and/or fluid paths. Some embodiments disclosed herein, however, comprise open systems that desirably comprise introduction of fluid into a chamber of the cylinder from an external source, such as a CO2 cylinder or other pressurized fluid source. In some embodiments, a fluid-powered actuator in an open system is further configured to expel or exhaust fluid (for example, to cause the fluid to be transferred externally to the actuator, such as into the environment or into an external chamber) from one or more of the chambers, and to have new fluid introduced into that chamber when the piston moves in an opposite direction.

In some embodiments, a fluid-powered linear actuator may comprise a first chamber and a second chamber. To move an output rod of the linear actuator in a first direction, pressurized fluid is introduced into the first chamber, creating a higher relative pressure in the first chamber with reference to the second chamber. A piston of the linear actuator will thus be caused to move, enlarging the size of the first chamber and decreasing the size of the second chamber, as long as there is an exit or exhaust path for fluid in the second chamber to be expelled or exhausted from the actuator, and/or the fluid in the second chamber comprises a compressible fluid. In some embodiments, an actuation rate of a fluid-powered linear actuator can be controllable at least partially by restricting an exhaust flow from the second chamber. For example, if there is no restriction on the fluid flow out of the second chamber, creation of a higher relative pressure in the first chamber may cause the linear actuator to quickly or rapidly actuate, which may be undesirable in some situations. In some situations, however, such rapid actuation may be desirable. In some embodiments, however, it may be desirable to at least partially control the actuation rate by introducing a flow restrictor, such as a nozzle, orifice or tube of a predetermined size, and/or the like into the exit or exhaust path from the second chamber. Such a flow restrictor may enable more precise control of, and/or damping of, the mechanical output of the fluid-powered actuator.

In some embodiments, it may be desirable to have relatively unrestricted flow in the exhaust path for moving the saddle in one direction, but a more restricted exhaust path flow when moving the saddle in the other direction. For example, it may be desirable in some embodiments to lower the saddle away from the rider as quickly as possible. When the rider wishes to raise the saddle back up, however, it may be desirable to have a more controlled raising that is less likely to cause injury to the rider when the saddle re-engages the rider. It should be noted that, although the present discussion refers to restriction of exhaust flow to control an actuation rate, various other methods of controlling the actuation rate may be used. Some examples of these methods include restricting the flow of a gas into the chamber that will be expanding (e.g., restriction on the inlet side instead of the exhaust side), restricting the flow of gas out of the stored energy device, controlling the level of friction between the upper and lower supports 320, 310 of the adjustable height saddle post (with reference to FIG. 1A), using a mechanical or pneumatic biasing spring that biases the saddle in a raised or lowered direction, utilizing a separate damper, and/or the like.

Although the above description has been given with respect to one direction of actuation, namely increased pressure in a first chamber that causes the actuator to move in a way that decreases a size of the second chamber, similar concepts may work in the reverse direction. For example, a fluid-powered actuator may be configured to be operable under active fluid power in both directions. An increased pressure in the second chamber with respect to the first chamber may cause the piston to move in the opposite direction, decreasing the size of the first chamber, and expelling fluid out of the first chamber and/or compressing a compressible fluid in the first chamber. In some embodiments, a piston of a fluid powered actuator as utilized herein desirably completely or substantially isolates a first fluid chamber from a second fluid chamber. As an example, in some embodiments, fluid that is introduced into the first chamber, regardless of which direction an output member of the actuator is moving, is never intended to pass through or otherwise bypass the piston to move into the second chamber.

Figure 2A:
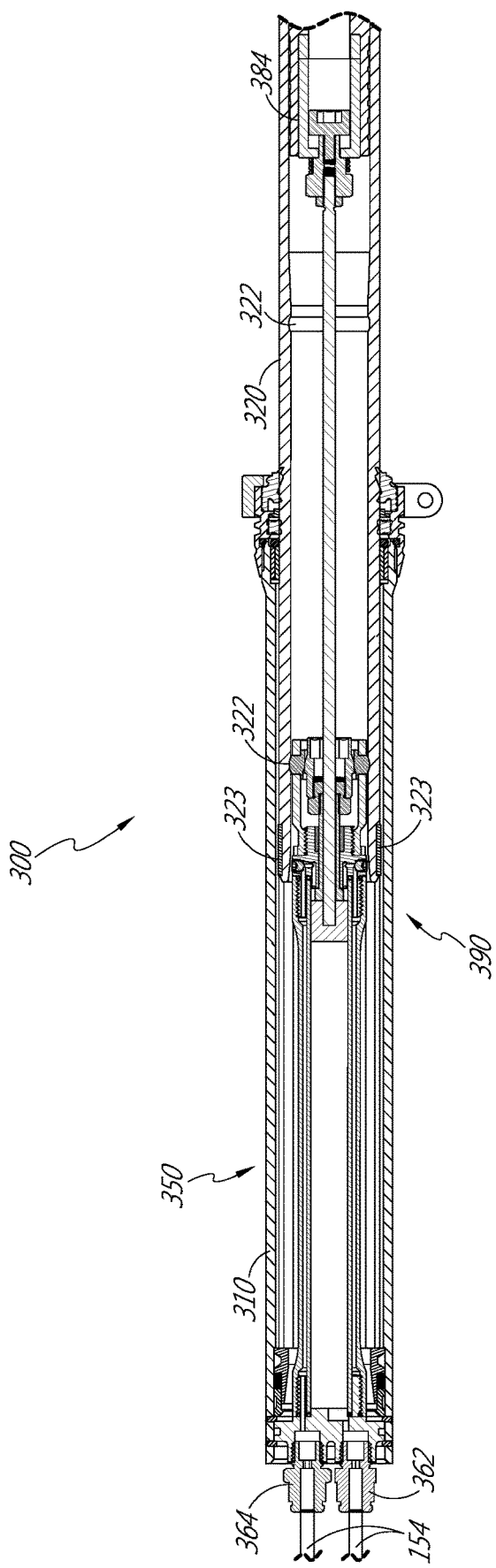
FIGS. 2A-2F illustrate cross-sectional views of an embodiment of an adjustable height saddle post assembly for use with an active adjustable saddle post system.

The embodiment illustrated in FIGS. 1A and 1B illustrates an example where the adjustable height saddle post 300 comprises an integrated linear actuator, such as is shown in FIG. 2A, described below. However, in various embodiments, the linear (or in some embodiments nonlinear) actuator used to extend and/or retract the seat post or saddle post may be located within the saddle post, integrated into the saddle post, located external to the saddle post, and/or the like. For example, in some embodiments, a linear actuator is positioned external to the adjustable height saddle post, and connected to, for example, a movable portion of the saddle post at one end (e.g., the upper support 320) and the bicycle frame at the other end, using, for example, pinned, pivot, ball joints, and/or the like. Such a configuration may, for example, enable use of a hydraulic or pneumatic cylinder (or other actuator, such as electromechanical) that has a shorter stroke than the full stroke of the adjustable height saddle post. As one of skill in the art would recognize, various linkage configurations may be utilized to make such a design more efficient, and or to customize the system to the capabilities of a specific actuator.

In another example, a linear actuator, such as a fluid powered cylinder, may be integrated into an adjustable height saddle post. For example, an adjustable height saddle post may comprise a set of two or more slidably coupled tubes that enable extension or retraction of the saddle post (for example, upper and lower supports 320, 310 of FIG. 1A). Further, one or more of those tubes may comprise an inner or outer surface that a piston seals against to create one or more chambers of a hydraulic or pneumatic cylinder. Such a design may enable an adjustable height saddle post system to be lighter and/or more compact than if a separate fluid powered cylinder were used.

As used herein, the word "piston" is used broadly to refer to a component that is slidably coupled with a mating surface and that seals or at least partially seals against the mating surface. The piston may be caused to move or slide with reference to the mating surface by a pressure differential between a first chamber in fluid communication with a first side of the piston and a second chamber in fluid communication with a second side of the piston. In some embodiments, a piston is cylindrical or substantially cylindrical in shape. In various other embodiments, a piston can be other shapes, such as a shape that conforms to the area available for the piston in a particular application. For example, in some embodiments, an area or cavity for positioning therein of the piston may be annular in shape, and the piston may desirably be annular in shape to fit within and seal within such area or cavity.

The disclosure herein uses the word "cylinder" or "cylinders" in reference to fluid powered actuators, such as a hydraulic cylinder or pneumatic cylinder. In some embodiments, the fluid powered actuator may not necessarily be cylindrical or completely cylindrical in design. For example, particularly with a design where the fluid powered actuator is integrated into a saddle post, one or more fluid chambers on either side of a piston may be non-cylindrical in shape, because their shape may at least partially be driven by the design of the overall saddle post. In many embodiments, however, it is desirable, for manufacturing efficiency, to utilize hydraulic or pneumatic cylinders that are cylindrical in shape. One of skill in the art would recognize, however, that the words "cylinder" or "cylinders" are terms of the art as used herein with reference to hydraulic or pneumatic cylinders, and, unless clearly indicated otherwise in context, this usage should not be interpreted to limit the physical shape of a specific component to being substantially or completely cylindrical.

Figure 3:
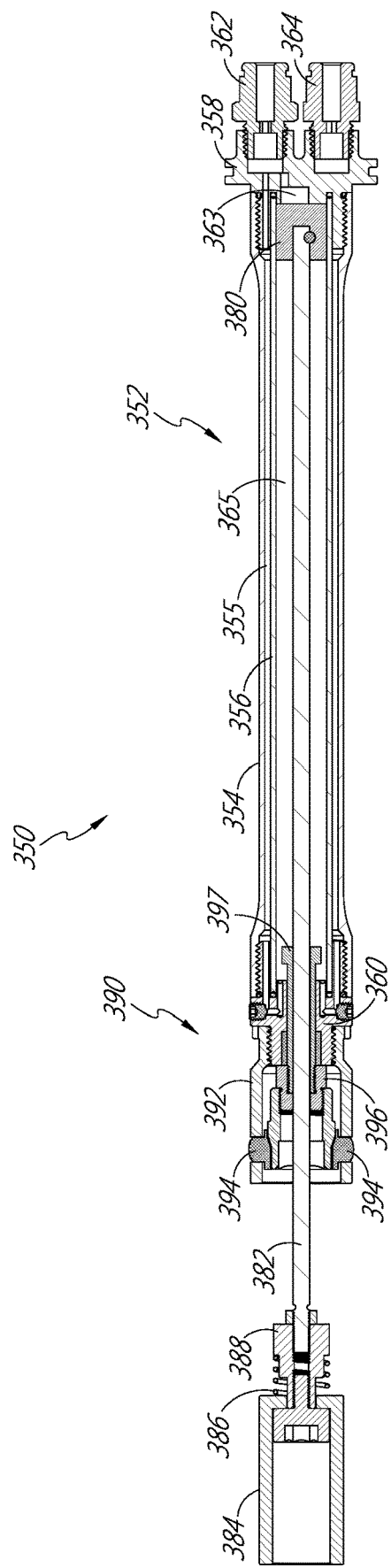
FIG. 3 illustrates a cross-sectional view of an embodiment of a fluid-powered linear actuator for use with an active adjustable saddle post system.

In various embodiments disclosed herein, an adjustable height saddle post may comprise a single active component that is configured to move a portion or portions of an adjustable height saddle post in both an extended direction and a retracted direction (for example, a fluid powered linear actuator as shown in FIG. 3). In some embodiments, however, a system may be configured to use different components for the two directions of motion (i.e. extend and retract). For example, in some embodiments, a system is configured to lower the seat post using a fluid powered linear actuator powered by an expendable compressed gas source (e.g., an open system), but to raise the seat post using an air spring (e.g., a closed system). In other embodiments, the system is configured to raise the seat post using the fluid powered linear actuator (e.g., an open system), but to lower the seat post using an air spring (e.g., a closed system).

In some embodiments, a system can be configured to comprise a first mechanism that biases the seat post in one direction (for example, a mechanism that is always introducing a bias force in a particular direction regardless of a user input or current configuration of the system), and a second mechanism that can selectively be used to overcome the biasing force to cause the seat post to move in a direction against the bias force. For example, an adjustable height seat post may comprise an air spring, mechanical spring, or other device that biases the seat in an upward or extended direction. The system may further comprise a selectively controllable actuator that can be caused to overcome the upward biasing force to move the seat or saddle downward, for example under the power of a fluid-powered linear actuator. Such an embodiment may be desirable to, among other things, reduce complexity and/or manufacturing costs. For example, in an embodiment where an adjustable height saddle post is controlled in both directions by a fluid-powered cylinder, more complicated valves, fluid paths, and/or control mechanisms may be required to direct or redirect a pressurized fluid source to an appropriate fluid chamber. However, in an embodiment where movement of an adjustable height saddle post is controlled by an open system fluid-powered cylinder in only one direction (with, for example, an air spring controlling the other direction), the valves, fluid paths, and/or control mechanism may be simpler.

In some embodiments, a fluid-powered actuator is configured to overcome an upward bias force (e.g., from an air spring or other spring) by itself to enable active downward movement of the seat post. In some embodiments, however, the fluid powered actuator is configured to only provide a force that overcomes a portion of the upward bias force from, for example, an air spring or other spring. For example, the fluid-powered actuator may be configured to provide a downward force that overcomes, for example, one half of the biasing force, two thirds of the biasing force, one third of the biasing force, and/or the like. Such an embodiment may be desirable, for example, to act as a rider-assist device that assists the rider in lowering the seat post, but still requires the rider to exert at least some external force on the saddle or seat post to cause movement of the seat post. For example, a biasing device, such as an air spring that provides an upward biasing force, may be configured to exert a maximum upward force of, for example, 2 pounds, 5 pounds, 10 pounds, 20 pounds, 30 pounds, 40 pounds, 50 pounds, and/or the like. Further, in some embodiments, the fluid-powered actuator may be configured to overcome all or a portion of the bias force by actively exerting a force in a direction opposite the biasing force of, for example, 2 pounds, 5 pounds, 10 pounds, 20 pounds, 30 pounds, 40 pounds, 50 pounds, 60 pounds, 70 pounds, 80 pounds, 90 pounds, 100 pounds, and/or the like. In some embodiments, the fluid powered actuator may be configured to operate using an input pressure of various levels. For example, the fluid powered actuator may be configured to operate using input fluid pressure of, for example, 10 psi, 25 psi, 50 psi, 75 psi, 100 psi, 150 psi, 200 psi, 250 psi, 300 psi, 350 psi, 400 psi, 450 psi, 500 psi, and/or the like. In some embodiments the input pressure is adjustable, such as using a regulator, to enable a rider to adjust a speed of actuation to his or her preference. For example, with reference to FIG. 1A, one or more pressure regulators may be functionally positioned between the stored energy device 150 and the control valve 152, between the control valve 152 and the control lines 154, between the control lines 154 and the saddle post 300, integrated into the stored energy device 150, integrated into the control valve 152, integrated into the control lines 154, integrated into the saddle post 300, and/or the like.

Mechanical Locking Mechanisms

In some embodiments, an actively controlled adjustable height saddle post comprises both fluid power and mechanical locking or retention mechanisms. For example, some embodiments may comprise a fluid powered source that actively moves the saddle up and/or down. The system may further comprise a mechanical locking mechanism that mechanically holds the saddle post in a certain position (in some embodiments, one of one or more predetermined positions; in some embodiments, any position) after the fluid powered linear actuator has moved to the saddle post to that position. In some embodiments, the mechanical locking or retention mechanism may comprise a radially expandable collect that is configured to engage one or more annularly shaped grooves of a support post of the adjustable height saddle post. Some examples of such a collet design may be found in U.S. Pat. No. 8,328,454, entitled VERTICALLY ADJUSTABLE BICYCLE ASSEMBLY, which is hereby incorporated by reference herein in its entirety. In such an embodiment, a collet comprises a plurality of arms that are radially expandable or contractible to selectively lock two support members together in a relative position. One disadvantage of such an embodiment, however, is that the radially expandable arms expand and contract by elastic bending of the arms, such that, when a support post of the adjustable height saddle post is translating with respect to another support post, the radially expandable arms are dragging against the other support post. In some embodiments, this dragging may be desirable to, for example, enable a user to know where the next groove is, because the user will feel and/or hear the arms fit into that groove. However, such dragging may not be desirable in some embodiments, because the dragging causes sliding friction, decreasing efficiency. The dragging may also lead to a jerky, inconsistent, or non-smooth motion and/or create vibrations as the collet moves past one or more intermediate grooves. Particularly in an embodiment where a user desires to quickly move the saddle between a fully extended and a fully retracted position (or any other predetermined position or positions that the saddle can be stopped at automatically by the system, without requiring fine adjustments by the rider), it can be desirable to minimize the friction and any potential jerkiness or vibration. By minimizing the friction (thus increasing efficiency), less stored energy is required to move the saddle post. Further, the saddle post may be moved at a faster rate with the same amount of energy usage. For example, at a given input pressure to the linear actuator, the linear actuator may move faster and/or smoother when there is less friction.

Disclosed herein is an alternate embodiment of a radially expandable collet that enables more efficient, smoother, and/or reduced friction translation of the support members of an adjustable height saddle post (or any other collapsible column). As will be further described below with reference to the figures (and particularly FIGS. 4, and 5A-5H), in some embodiments, a collet comprises one or more arms or locking members that are pivotally or slidably coupled to a body of the collet. By utilizing freely movable joints, such as a pivot joint or sliding joint (as opposed to a body-integrated arm that elastically bends), it can be easier to retain the arms or locking members in a retracted position where they do not drag against the inner surface of a support member of the adjustable height saddle post.

Automatically Locking Actuator

In some embodiments, as further described below (for example, with reference to FIGS. 2A-2F), a fluid powered cylinder or other linear actuator may be configured to perform more than one function. For example, in addition to being configured to cause extension and/or retraction of a support member of the adjustable height saddle post, the actuator may also be configured to cause locking and/or unlocking of a mechanical locking or retention mechanism, such as a collet. For example, in some embodiments, the linear actuator comprises a piston attached to a rod that, when the piston moves, causes a support of the adjustable height saddle post to move. In some embodiments, the piston is compliantly attached to or coupled to the support, such that the piston may continue to move for at least a predetermined distance once the support of the adjustable height saddle post has stopped moving. For example, the support of the adjustable height saddle post may have stopped moving because it hit a mechanical stop or limit, such as at a fully extended or fully retracted position (or any other predetermined position). In some embodiments, a mechanical stop or similar component is configured to be user-adjustable, such that a user or rider can configure the seat post to automatically actuate to and stop at one or more predetermined positions that may not necessarily be a fully extended or fully retracted position. In some embodiments, further motion of the piston is configured to engage and/or disengage a locking mechanism that mechanically retains the adjustable height saddle post in its present position. In some embodiments, fluid pressure may then be removed or reduced, and the adjustable height saddle post will remain in the locked position through use of the mechanical locking mechanism. In some embodiments, however, the system is configured to require that the fluid cylinder maintain or at least substantially maintain pressure to maintain the piston in the appropriate position that keeps the mechanical locking mechanism locked. In such an embodiment, a reduction of pressure in the cylinder can be configured to cause an automatic unlocking of the mechanical locking mechanism, because the piston may start to translate in the opposite direction. Accordingly, in some embodiments, a single motion of a piston of a fluid cylinder can be configured to both (1) cause extension and/or retraction of an adjustable height saddle post and to (2) lock and/or unlock a mechanical locking mechanism of the adjustable height saddle post that mechanically locks the post in one or more predetermined positions.

Various embodiments disclosed herein utilize a compressed gas source, such as a cylinder comprising compressed air, nitrogen, carbon dioxide, and/or the like. In some embodiments, the system is configured to utilize that compressed source, and then require replenishment of the compressed source after a certain number of uses. For example, the system may be configured to enable use of single-use disposable $CO_2$ cartridges that can be easily replaced by the rider. In other embodiments, the system can be configured to be recharged using, for example, an air pump or other compressed gas source. It should also be noted that, although various embodiments disclosed herein disclose using a fluid powered cylinder and a compressed fluid source, various embodiments may also utilize other methods of actuation and energy storage, such as an electromechanical actuator that utilizes stored electrical energy, such as energy stored in a rechargeable battery pack.

Active Adjustable Height Saddle Post System

One embodiment of an active adjustable height saddle post system is shown in FIGS. 1A and 1B. This embodiment comprises an adjustable height saddle post 300 that is actively repositionable by a stored energy device 150 that, in this embodiment, stores compressed gas for distribution to the adjustable height saddle post 300 by a control valve 152 and two control lines 154. The adjustable height saddle post 300 is described in further detail below, with reference to FIGS. 2A-2F. It should be noted, however, that the adjustable height saddle post 300 disclosed herein is merely one example embodiment, and various other saddle posts may be used with the concepts disclosed herein. For example, U.S. Pat. No. 8,926,216, entitled ADJUSTABLE ASSEMBLY FOR A BICYCLE, which is hereby incorporated by reference in its entirety and made a part of the present application, and U.S. Pat. No. 8,328,454, entitled VERTICALLY ADJUSTABLE BICYCLE ASSEMBLY, which is hereby incorporated by reference in its entirety and made part of the application, each describe one or more embodiments of an adjustable height saddle post that may be used with or adapted to be used with one or more of the concepts disclosed herein. The adjustable height saddle post 300 can be desirably configured to enable the rider to selectively adjust the height of the saddle 105 without requiring an external force, such as the user's body weight, to lower the post, or a pulling force to raise the post. The adjustable height saddle post 300 can in some embodiments be selectively adjusted by the rider via a controller 301, desirably mounted on the handlebars, while the rider is riding the bicycle.

Active saddle height adjustment systems and mechanisms as disclosed herein have a variety of benefits. For example, when a rider is riding a bicycle, there may be different situations where the rider wishes his or her saddle to be at a different height. For example, when riding uphill, the rider may wish the saddle to be in a higher position than when riding downhill. Further, in some situations, such as when riding downhill, a rider may wish the saddle to be down and out of the way, because the rider may not even desire to use the saddle. The saddle height adjustment systems and mechanisms disclosed herein provide solutions to many of these problems.

Some embodiments of adjustable height saddle post systems and mechanisms as disclosed herein further provide damping in the saddle height adjustment. This can be advantageous for various reasons, such as to reduce injury and increase comfort. For example, when a rider reengages the saddle, the rider will likely wish for the saddle post to move upward into a raised position, sometimes known as the power position. However, without damping, the saddle may in some embodiments snap upward and strike the rider, potentially injuring the rider. By including damping in the saddle post height adjustment system, the saddle can return to the extended, upper, and/or power position in a comfortable and controlled manner. In some embodiments, the damping is provided by, for example, forcing fluid exiting a chamber of a hydraulic or pneumatic cylinder through an orifice of a predetermined and/or variable size, thus restricting the rate of fluid flow.

FIG. 1A illustrates a side view of a bicycle 100 including one embodiment of an adjustable height saddle post assembly 300 in a raised, upper, or extended position. FIG. 1B illustrates a side view of the bicycle 100 including the adjustable height saddle post assembly 300 in a lowered or retracted position. The adjustable height saddle post 300 can include a first support, such as, for example, a lower support 310, and a second support, such as, for example, an upper support 320. The lower support 310 can be adapted to attach to a bicycle frame 110 of the bicycle 100. In some embodiments, the lower support 310 can be configured to slide within a seat tube 115 of the bicycle frame 110 and be clamped in place such that the lower support 310 does not move relative to the seat tube 115 of the bicycle frame 110 while the bicycle 100 is ridden. In some embodiments, the lower support 310 can be integrated into or form a part of the seat tube 115 instead of being slidably coupled to the seat tube 115. The upper support 320 can be configured to slidably move relative to the lower support 310 between an upper, extended, or raised position, as illustrated in FIG. 1A, and a lowered or retracted position, as illustrated in FIG. 1B. In some embodiments, the upper support 320 can be configured to slide within at least a portion of the lower support 310. In some embodiments, the adjustable height saddle post 300 may comprise more than two supports that collapse at least partially within one another, for example, to enable a greater range of motion from a particular collapsed overall envelope size.

The adjustable height saddle post 300 can comprise an adjustable range. A completely lowered or retracted position of the upper support 320 comprises a position within the adjustable range of the adjustable height saddle post 300 at which the saddle 105 is closest to the lower support 310. A raised or extended position of the upper support 320 comprises all height positions of the upper support 320 above the lowered position within the adjustable range of the adjustable height saddle post 300, with a completely raised or extended position comprising a position at which the saddle 105 is furthest from the lower support 310. In some embodiments, the adjustable height saddle post 300 comprises predetermined positions at which the upper support 320 can lock in place relative to the lower support 310 (e.g., by a collet engaging a groove of the lower support 310). In some embodiments, the predetermined positions comprise only the completely or fully lowered and/or completely or fully raised positions. In some embodiments, the predetermined positions comprise one or more positions not at the completely lowered and/or completely raised positions. In some embodiments, the upper support 320 is infinitely adjustable, meaning the upper support 320 can be mechanically locked into position with respect to the lower support 310 at any position within the adjustable range of the adjustable height saddle post 300. For example, such infinite adjustment may be accomplished by a collet that engages a support post surface using friction, instead of engaging a groove of the support post. As another example, such infinite adjustment may be accomplished by utilizing the actuator that actively moves the support to also hold the support in position (as opposed to a separate mechanical locking mechanism).

In some embodiments, the adjustable range of the adjustable height saddle post 300 can be greater than ¼". In some embodiments, the adjustable range of the adjustable height saddle post 300 can be greater than ½". In some embodiments, the adjustable range of the adjustable height saddle post 300 can be greater than 1". In some embodiments, the adjustable range of the adjustable height saddle post 300 can be greater than 2". In some embodiments, the adjustable range of the adjustable height saddle post 300 can be greater than 3". In some embodiments, the adjustable range of the adjustable height saddle post 300 can be greater than 4". In some embodiments, the adjustable range of the adjustable height saddle post 300 can be greater than 5". In some embodiments, the adjustable range of the adjustable height saddle post 300 can be greater than 6". In some embodiments, the adjustable range of the adjustable height saddle post 300 can be greater than 7". In some embodiments, the adjustable range of the adjustable height saddle post 300 can be greater than 8". In some embodiments, the adjustable range of the adjustable height saddle post 300 can be greater than 9". In some embodiments, the adjustable range of the adjustable height saddle post 300 can be greater than 10". In some embodiments, the adjustable range of the adjustable height saddle post 300 can be greater than 11". In some embodiments, the adjustable range of the adjustable height saddle post 300 can be greater than 12". In some embodiments, the adjustable range of the adjustable height saddle post 300 can be greater than 1" and less than 12". In some embodiments, the adjustable range of the adjustable height saddle post 300 can be greater than 2" and less than 10". In some embodiments, the adjustable range of the adjustable height saddle post 300 can be greater than 3" and less than 8". In some embodiments, the adjustable range of the adjustable height saddle post 300 can be greater than 4" and less than 6".

In some embodiments, the adjustable height saddle post 300 can comprise a spring configured to bias the upper support 320 towards a raised or lowered position relative to the first support 310. In some embodiments, the spring can be an air spring. In some embodiments, the adjustable height saddle post 300 can include a locking mechanism adapted to limit movement between the lower support 310 and upper support 320 when the locking mechanism is in a locked position and to allow relative movement between the lower support 310 and upper support 320 when the locking mechanism is in an unlocked position. In some embodiments, the locking mechanism can be located at the bottom of the adjustable height saddle post 300. In some embodiments, the locking mechanism can be located at the bottom of the upper support 320. In some embodiments, the locking mechanism can comprise a biasing member configured to default the locking mechanism to a locked (or in some embodiments an unlocked) position. In some embodiments, the locking mechanism can be configured to be operated by the controller 301. Once the rider releases the controller 301, the locking mechanism can be configured to move to a locked position and limit movement between the lower support 310 and upper support 320. As further described elsewhere in this disclosure, in some embodiments the locking mechanism may be configured to be automatically engaged or disengaged by a fluid-powered linear actuator that also moves the upper support 320 with respect to the lower support 310 (with the fluid-powered linear actuator in some embodiments being controllable by the controller 301).

The controller 301 in some embodiments can comprise a lever, button, and/or the like which the rider can push, rotate, or otherwise operate to activate active extension or retraction of the seat post (which may in some embodiments include unlocking the locking mechanism). The controller 301 can be located in a convenient location for the rider, which may include, for example, the handlebars as illustrated in FIGS. 1A and 1B. In some embodiments, the controller 301 can be connected to the stored energy device 150, the control valve 152, the adjustable height saddle post 300, a separate fluid-powered actuator, a separate controller, and/or the like with a cable, an electrical wire, a wireless electrical connection, and/or the like. A cable or electrical wire can in some embodiments be routed through the bicycle frame 110. In some embodiments, the cable or electrical wire can be routed outside the frame 110.

Active Adjustable Height Saddle Post

FIGS. 2A-2F illustrate cross-sectional views of one embodiment of an adjustable height saddle post 300. The adjustable height saddle post 300 comprises a lower support 310 and an upper support 320. The adjustable height saddle post 300 further comprises a fluid powered linear actuator 350 that can utilize a stored energy source to selectively extend and/or retract the upper support 320 with respect to the lower support 310 without requiring application of an external force from the rider. In this embodiment, the linear actuator 350 is positioned within or substantially within the lower and upper supports 310, 320. In various other embodiments, the fluid powered linear actuator 350 may be positioned within the supports in a different orientation (for example, flipped upside down), may be positioned partially outside of the supports, may be positioned fully outside of the supports, and/or the like. In this embodiment, the linear actuator 350 comprises two fluid connectors 362, 364. Control lines 154, such as the control lines 154 depicted in FIG. 1A, can be coupled to the fluid connectors 362, 364 to enable the linear actuator 350 to actively extend or retract the upper support 320 with respect to the lower support 310. For example, a pressurized fluid, such as a compressed gas or hydraulic fluid, may be caused to flow into the actuator 350 through the fluid connector 362, which will cause the upper support 320 to extend with respect to the lower support 310. Further, passing compressed or pressurized gas and/or hydraulic fluid into the linear actuator 350 through the fluid connector 364 may cause the upper support 320 to retract with respect to the lower support 310.

FIG. 3 is a cross-sectional view that illustrates additional details of the fluid powered linear actuator 350 of the adjustable height saddle post 300 shown in FIG. 2A. In this embodiment, the linear actuator 350 comprises a pneumatic or hydraulic cylinder. The linear actuator 350 comprises a body 352 which comprises an outer cylinder 354, an inner cylinder 356, a bottom housing or plug 358, a top housing or plug 360, and seals 359. The bottom housing 358 comprises the fluid connectors 362 and 364. The fluid connector 362 enables fluidic access to or fluid communication with a first fluid chamber 363. The fluid connector 364 enables fluidic access to or fluid communication with a second fluid chamber 365. The two fluid chambers 363, 365 are separated by a piston 380 slidably coupled with an interior surface of the inner cylinder 356. Accordingly, increasing a relative pressure of the fluid chamber 363 in relation to the fluid chamber 365 will cause a force to be introduced on the piston 380 that causes the piston 380 to move in a direction toward the top housing 360. On the other hand, an increase in pressure of the fluid chamber 365 with reference to the fluid chamber 363 will cause the piston 380 to move in a direction toward the bottom housing 358.

Figure 2B:
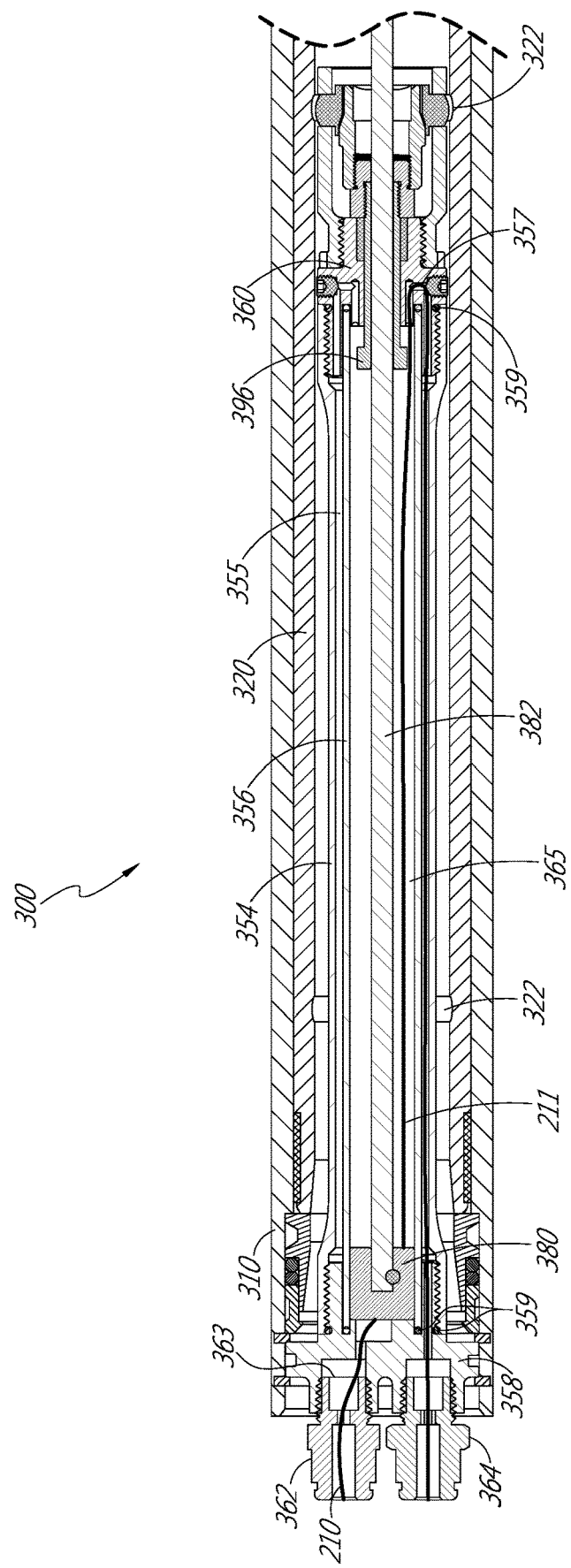

Further detail of example fluid flow paths within the two fluid chambers 363, 365 is shown in FIG. 2B by lines 210 and 211. As can be seen in FIG. 2B, fluid chamber 363 comprises a relatively direct path 210 from the connector 362 to the piston 380. This flow path 210 is relatively direct, because an increased pressure in chamber 363 is used to push the piston 380 away from the bottom housing 358. The second fluid chamber 365, on the other hand, comprises a relatively indirect fluid flow path 211. This is because the fluid chamber 365 is utilized to return the piston 380 in a direction toward the bottom housing 358. As can be seen in FIG. 2B, fluid that enters the assembly through connector 364 passes between the outer cylinder 354 and inner cylinder 356 within a gap 355 created between the two concentric cylinders (which, in this embodiment, are cylindrical or substantially cylindrical in shape, although they do not have to be cylindrical in shape in some embodiments). At an end of the gap 355 is one or more orifices 357 that enable access to an interior of the inner cylinder 356 and thus to the piston 380.

Returning to FIG. 3 (although also shown in other figures), the piston 380 is coupled to a rod 382 which extends beyond the top plug or housing 360. The rod 382 is coupled to a seat post support mount 384. The seat post support mount 384 is configured to attach to or otherwise couple with the upper support 320 of the adjustable height seat post 300. Accordingly, movement of the piston 380 relative to the body 352 results in movement of the seat post support mount 384 relative to the body 352. Further, with reference to FIG. 2A, the linear actuator 350 is shown assembled into the lower support 310 and rigidly or substantially rigidly coupled to the lower support 310. Accordingly, movement of the seat post support mount 384 in relation to the body 352 will also result in extension or retraction of the upper support 320 with respect to the lower support 310.

The rod 382, as shown in FIG. 3 (and also FIGS. 2C and 2F), is compliantly coupled to the seat post support mount 384 through a spring 386 and plunger 388. The spring 386 and plunger 388 enable the rod 382 to move at least a predetermined distance in an axial direction with respect to the seat post support mount 384. Accordingly, this enables the piston 380 to continue to move with respect to the body 352, for at least a predetermined distance, once the upper support 320 has stopped moving with relation to the lower support 310, such as because the upper support 310 contacted a hard stop or limit mechanism that limits a stroke of the upper support 320 with respect to the lower sport 310. Various methods of hard stops or stroke limiting mechanisms may be used. In the embodiment illustrated in FIG. 2A, keys 323 are desirably used to limit the extension stroke of the upper support 320 with respect to the lower support 310. One of skill in the art will recognize that various stroke limiting mechanisms may be used, such as, for example, snap rings, washers, other radially protruding members, and/or the like.

Although in this embodiment the rod 382 is compliantly coupled to the seat post support mount 384, various other methods may be used to enable the piston 380 to continue to move once the seat post supports have discontinued moving, such as from hitting the end of their stroke. For example, the piston 380 may be compliantly coupled to the rod 382, the seat post support mount 384 may be compliantly coupled to the upper or lower support 310, 320, the rod 382 may be at least partially collapsible, and/or the like.

Enabling the piston 380 to move independently of the seat post support mount 384 and/or the upper support 320 (for at least a predetermined range) can be advantageous to enable automatic actuation of a locking mechanism. With reference to FIG. 3, the fluid powered linear actuator further comprises a collet 390 coupled to the top plug or housing 360. The collet 390 comprises a housing or body 392 having a plurality of arms or locking members 394. The arms or locking members 394 in this embodiment are slidably coupled to the body 392, such that the locking members 394 can slide in a radial direction to expand to extend out of the body 392, or to retract to extend within the body 392. Although in this embodiment the locking members 394 are slidably coupled to the body 392, various other coupling or joining means may be used. For example, the locking members 394 may be pivotally coupled to the body 392. In other embodiments, the locking members or arms 394 may be part of the body 392, and may be configured to elastically bend or otherwise deform to radially expand or retract. As discussed above, one of the benefits of using locking members that are slidably or pivotally coupled to the body is that the locking members can be retracted far enough away from the inner surface of the upper support that they do not drag against the upper support as the upper support is moving with respect to the lower support. In a case where the locking members or arms are a part of the body, and elastically bend to disengage the grooves of the upper support, the arms may drag against the interior surface of the upper support and cause undesirable friction, vibration, and/or the like. In some embodiments where the locking members are slidably or pivotally coupled to the body, the locking members may still drag at least somewhat against the interior surface of the upper support, but they may not be forced against the surface like an elastically bent arm would be. In some embodiments, the locking members or arms may be part of the body and configured to elastically bend, but a free or unbent position of the arms may bias the arms inward instead of outward. In such an embodiment, the free or unbent position of the arms can be a relatively low-friction position (e.g., not dragging against the upper support), and an actuating member 396, such as a cam slide, can cause the arms to elastically bend outward when needed to engage a groove of the upper support.

The actuating member 396 is configured to slide in an axial direction, guided by bushing 397, and engage an interior surface of the arms or locking members 394. In the embodiment shown in FIG. 2E, the actuating member 396 comprises a proximal end positioned to be engaged by the piston 380, and a distal end positioned to engage the locking member 394. An outer surface 398 of the distal end of the actuating member 396 comprises a ramped shape or tapered shape or cam shape, enabling axial translation of the actuating member 396 relative to the locking members 394 to result in radial expansion or contraction of the locking members 394. The actuating member 396 further comprises an actuation surface 399 at its proximal end positioned to mate with the piston 380 when the piston 380 nears the top plug or housing 360. Once the piston 380 contacts the actuation surface 399, additional axial sliding or translation of the piston 380 can be configured to cause the actuating member 396 to axially translate with respect to the locking members 394, causing the locking members 394 to expand radially from the housing or body 392, locking the locking members within a groove of a support member, such as one of the grooves 322 of the upper support 320, as shown in FIG. 2E.

In some embodiments, the collet 390 comprises an engaged configuration and a disengaged configuration (or a locked and unlocked configuration). The engaged or locked position or configuration may comprise any configuration wherein the arms or locking members 394 radially expand from the body 392 sufficiently that at least a portion of the arms or locking members 394 protrude radially from the body 392 sufficiently to at least partially protrude into or fit within a groove of a support, such as one of the grooves 322 of the upper support 320 illustrated in FIG. 2A. The unlocked or disengaged configuration may comprise any configuration wherein the arms or locking members 394 do not extend radially from the body 392 sufficiently to protrude into or fit within a groove of a support, such as one of the grooves 322 of the upper support 320 illustrated in FIG. 2A. Accordingly, a disengaged or unlocked configuration may not necessarily require that the arms or locking members 394 be positioned completely or totally within the body 392. In some embodiments, at least a portion of the arms or locking members 394 may still protrude radially from the body 392 in the unlocked position. For example, if there is a gap or space of a particular size between an outer surface of the body 392 and an inner surface of the upper support 320, the arms or locking members 394 may protrude within that space in the unlocked configuration, as long as they do not protrude beyond that space, which would cause the arms or locking members 394 to contact the inner surface of the upper support 320, creating friction or drag, and/or to protrude into a groove 322 of the upper support 320. In some embodiments, the unlocked or disengaged configuration comprises positioning the locking members or arms 394 with respect to the body 392 such that each of the locking members or arms 394 fits or is positioned within a radial envelope diameter, wherein the radial envelope diameter is equal to or less than an inner diameter of the upper support 320.

In some embodiments, opposing locking members or arms are positioned on opposite sides of a collet body (such as with the collet illustrated in FIGS. 4A and B), the arms being positioned on opposite ends of a cord extending through a center of the collet body as viewed from the top or end of the collet body. In some embodiments, movement of the actuating member 396 generates movement of the opposing locking members or arms of substantially the same magnitude on either side. In some embodiments, in the unlocked or disengaged configuration, a lateral distance (or length of the chord) measured across outermost radial surfaces of the opposing arms (for example, distance 395 shown in FIG. 2E, which shows the collet in the locked configuration) is less than or equal to an inner diameter of the upper support 320 (for example, diameter 321 shown in FIG. 2E). In other embodiments, locking members or arms may be spaced around the collet body but not necessarily having any one collet arm or locking member be positioned opposite to another (such as with the configuration illustrated in FIGS. 5A-5H, which utilizes three equally-spaced arms). Further, in some embodiments, only a single locking member or arm is utilized. Such an embodiment may be desirable to, for example, reduce complexity and/or cost.

In some embodiments, a low friction collet as disclosed herein comprises a friction reducing mechanism or material on or part of the arms or locking members 394 that enables the arms or locking members 394 to drag along the inner surface of the upper support 320 while translating, but with reduced friction with respect to a standard collet arm. For example, the arms or locking members 394 and/or the inner surface of the upper support 320 may comprise a friction reducing material or coating, such as oil, grease, polytetrafluoroethylene (PTFE), and/or the like. In some embodiments, the arms or locking members 394 may comprise a bearing, such as a roller bearing or ball bearing configured to roll along an inner surface of the upper support 320 to reduce friction.

In some embodiments, the arms or locking members 394 of the collet 390 are coupled to the body 392 using a joint that biases the arms or locking members 394 in an outer or inner direction. For example, a spring may be included that biases the arms or locking members 394 in an inward or outward radial direction with respect to the body 392. It may be advantageous in some embodiments to, for example, bias the arms or locking members 394 inward, so that the arms or locking members 394 automatically move radially inward to a disengaged or unlocked position when the actuating member 396 moves to an unlocked position. As one example, with reference to FIG. 2E, an elastic member, such as an O-ring or other loop of rubber or other elastic material, may be stretched around the outer surfaces 393 of the locking members 394, thus biasing the locking member 394 inward when the actuating member 396 is not forcing the locking members 394 outward.

Figure 2C:
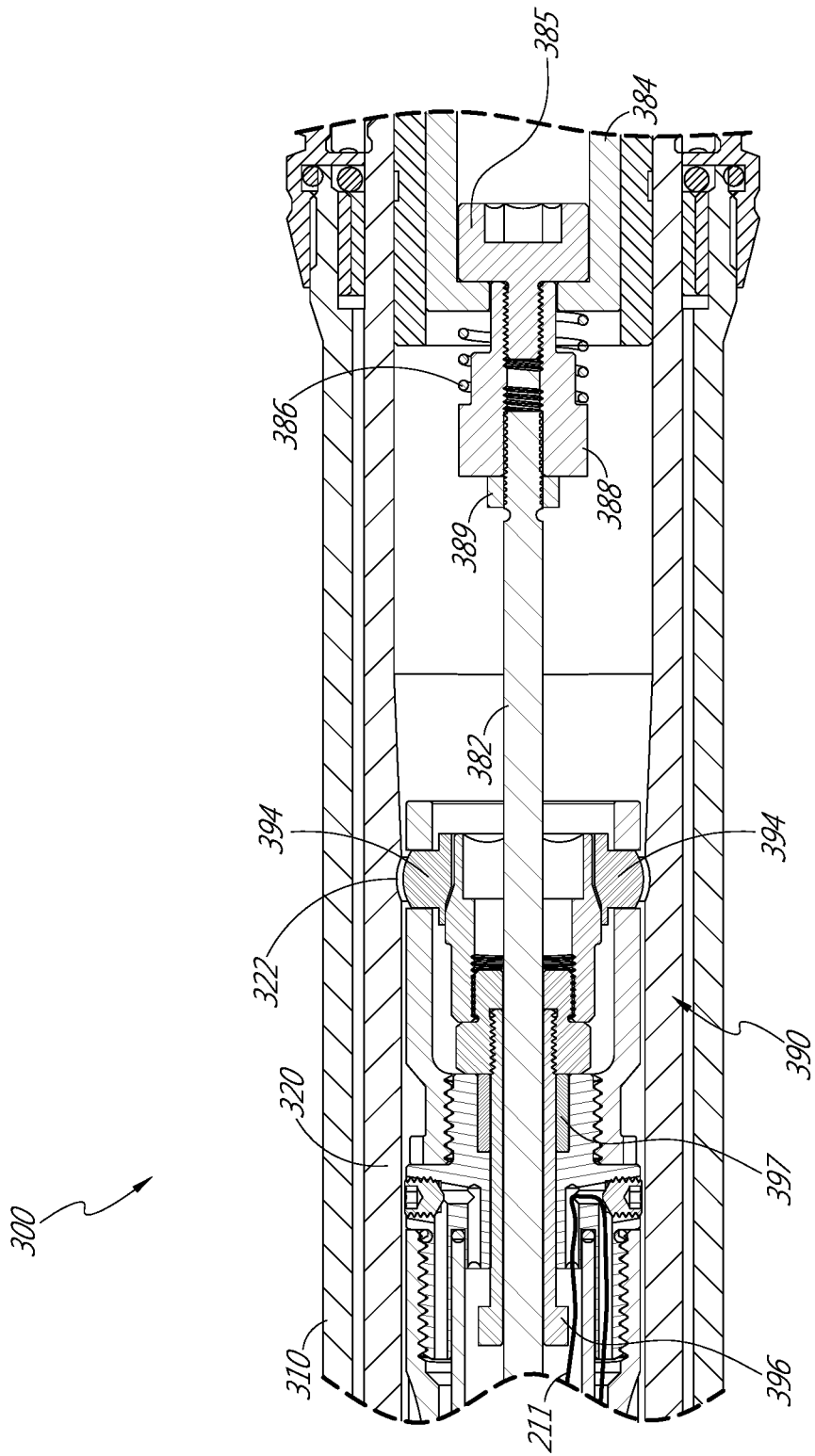

FIG. 2C illustrates a closer cross sectional view of a portion of the adjustable height seat post 300 in a fully retracted position. This is as opposed to the depiction of FIG. 2A, which shows the adjustable height saddle post 300 in a fully extended position. In FIG. 2A, the collet 390, and more specifically locking members 394, are engaged in the bottommost groove 322 of the upper support 320, indicating the fully extended position. In FIG. 2C, on the other hand, the collet 390, and more specifically locking members 394, are engaged in the uppermost groove 322 of the upper support 320, indicating the fully retracted position. FIG. 2C illustrates further detail of the compliant coupling mechanism that enables the piston rod 382 to be compliantly coupled to the seat post support mount 384. In this embodiment, a jam nut 389 helps retain the plunger 388 to an end of the rod 382. The spring 386 provides an outward biasing force between the plunger 388 and the seat post support mount 384. A bolt 385 limits amount of extension of the spring 386. Accordingly, once the upper support 320 hits the extended stroke limit, as defined in this embodiment by keys 323 (shown in FIGS. 2A and 2D), the upper support 320 will stop moving in the extend direction, but continued pressure in fluid chamber 363 may cause the rod 382 to continue to move in an extend direction (to the right with reference to FIG. 2C), enabling the piston 380 to engage the actuating member 396 as illustrated in FIG. 2E. By moving the actuating member 396 further in an extend direction with respect to the locking members 394, the locking members 394 are forced to expand radially, or, if they are already expanded radially, are forced to remain in a radially expanded position, locking the upper support 320 with respect to the lower sport 310 (as is shown in more detail in FIG. 2E).

Figure 2D:
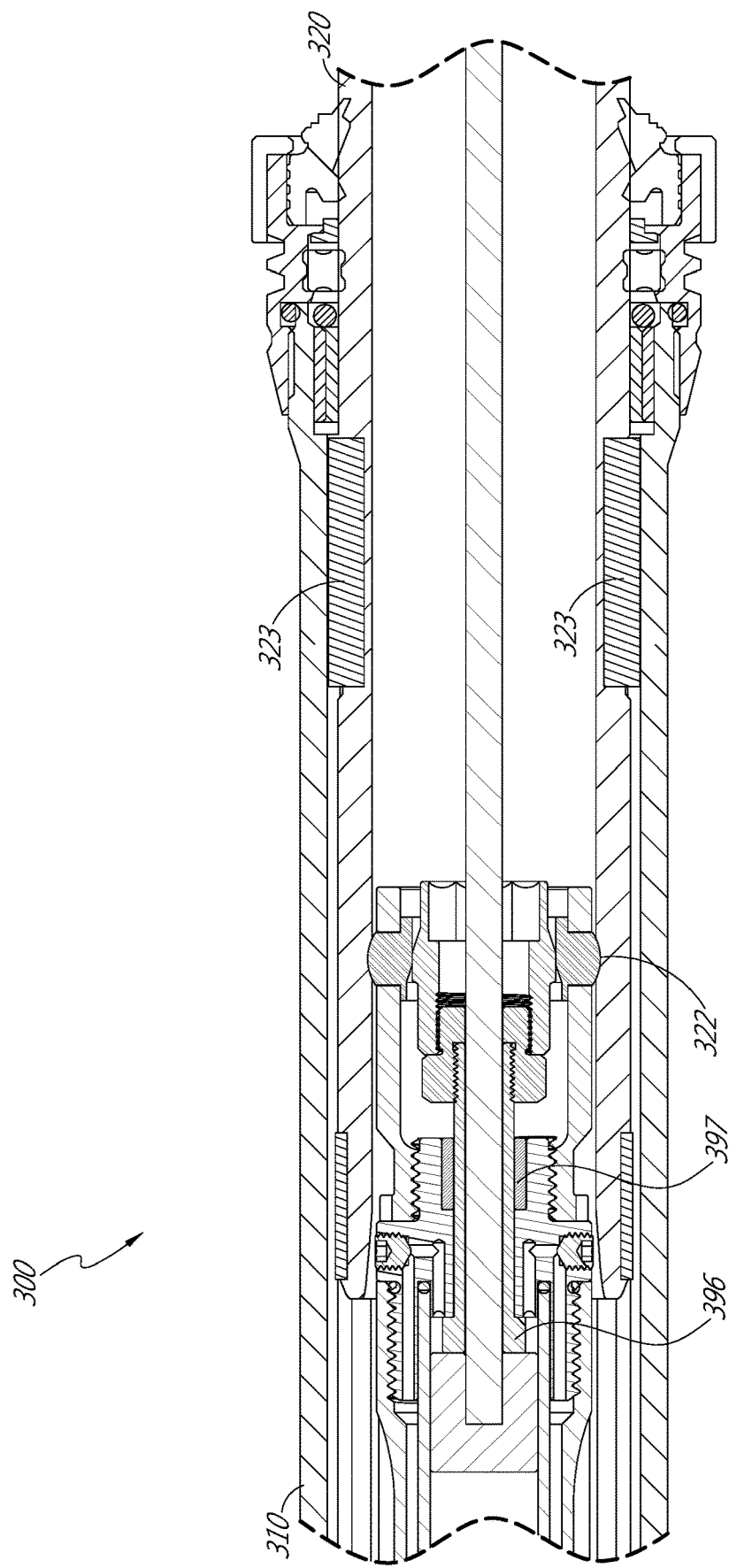
Figure 2E:
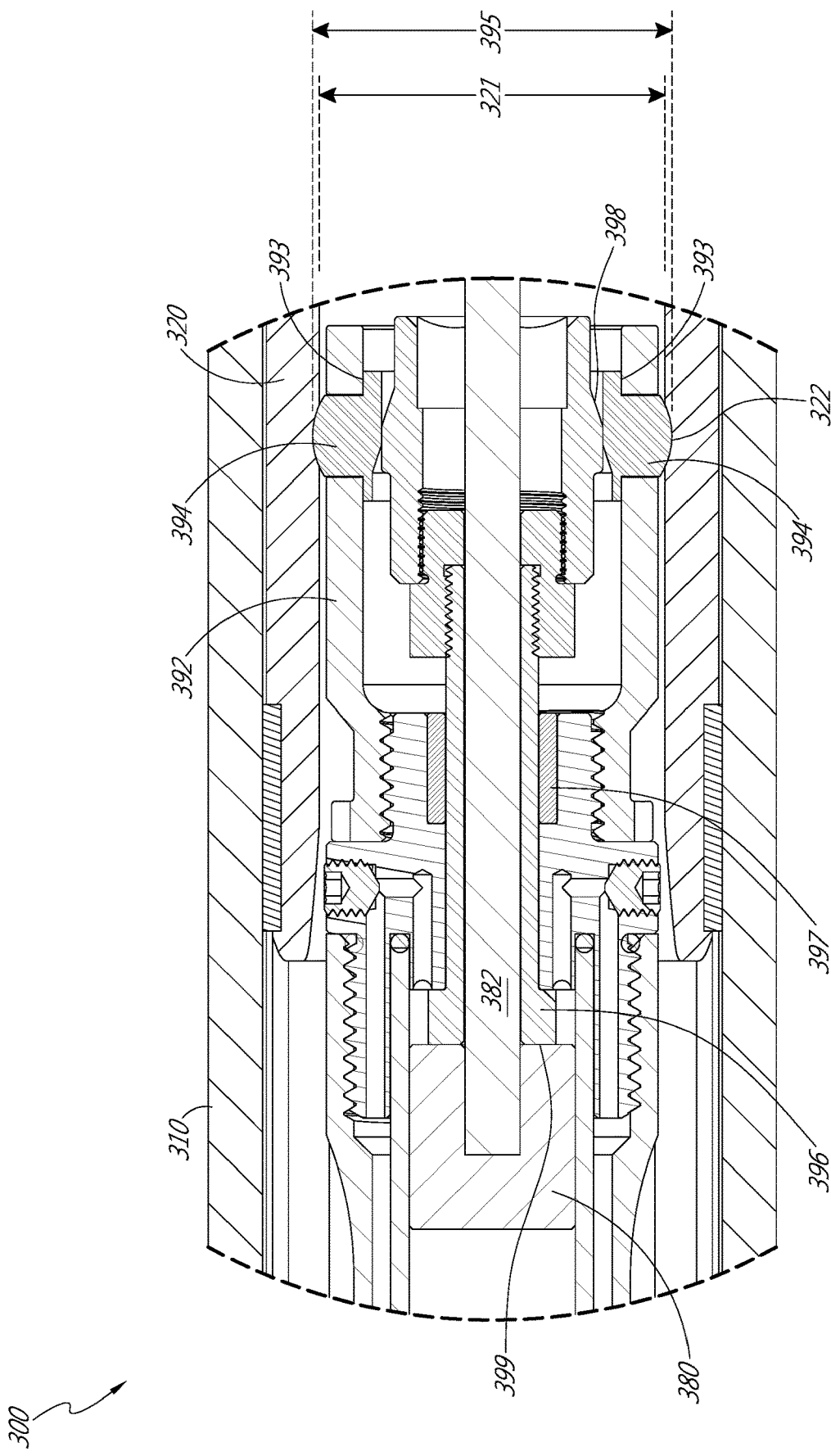
Figure 2F:
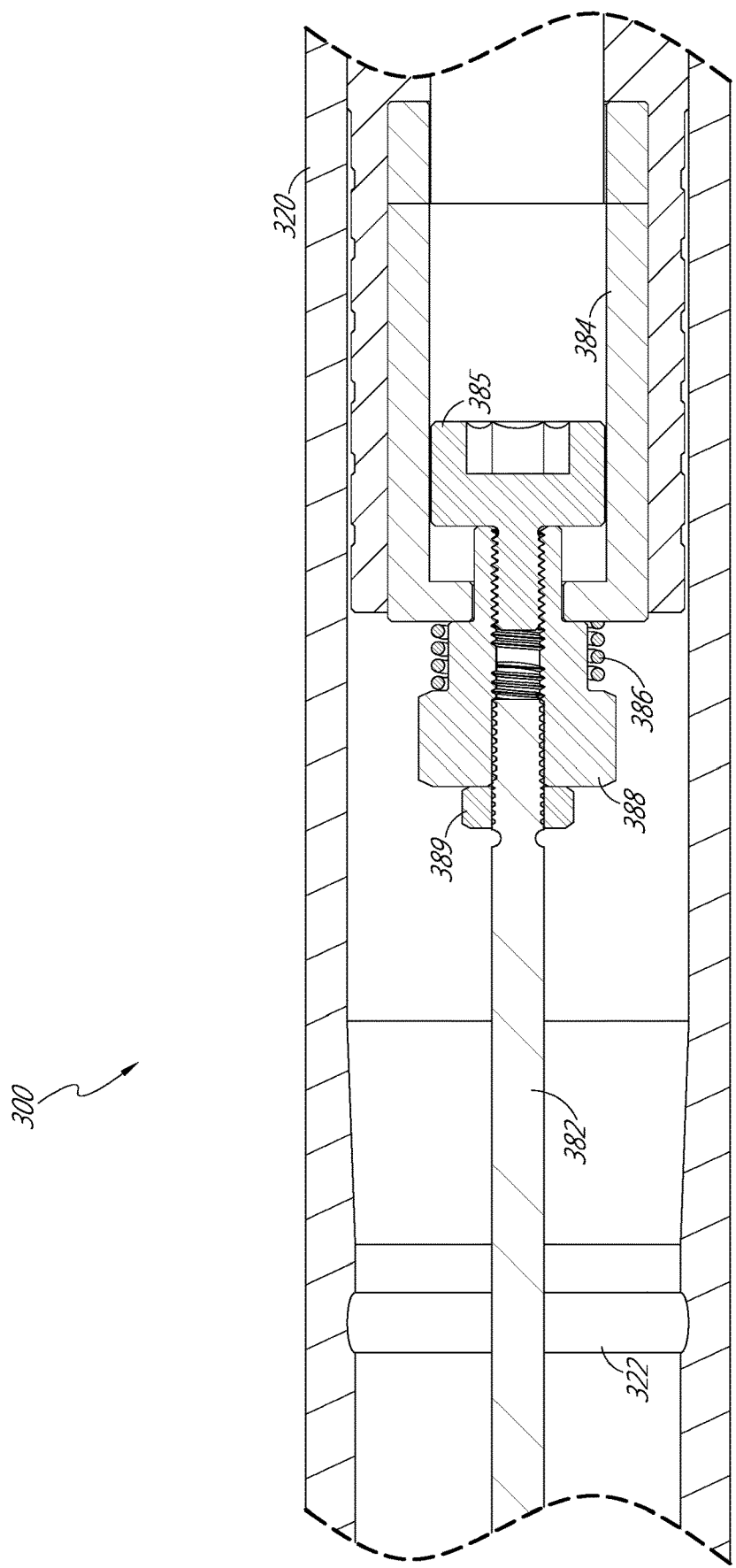

In this embodiment, the fully extended position is defined by stops or stroke-limiting components, namely, the keys 323 shown in FIG. 2D, which limit extension of the upper support 320 with respect to the lower support 310. The keys 323 may be in a fixed position (e.g., fixed at production, and not user-adjustable), or, in some embodiments, the keys 323 may be adjustable by the rider, such as during or before a ride, to enable adjustment of the predetermined fully extended position. Further, one of skill in the art will recognize that other methods of defining the stroke of the adjustable height saddle post (by setting one or both of the fully extended and fully retracted positions) may be used. For example, a stop surface (created by a key, pin, or other device) may be movable or repositionable by the rider or user to adjust the predefined fully extended or fully retracted position. In some embodiments, the stop surface is repositionable in a discreet number of positions, with each position comprising a corresponding groove 322 for engagement by the collet 390 when the upper support 320 reaches that position.

Low-Friction Collets

Various embodiments disclosed herein can be configured to utilize a low friction collet. For example, as described above, a collet may comprise one or more locking members or arms that are pivotally, slidably, or otherwise coupled to a body in such a way that enables them to be retracted radially inward a sufficient amount such that they do not drag on the interior surface of a support while in an unlocked configuration (or that reduces or minimizes any friction caused by such drag). As discussed above, limiting the friction between the collet and inner surface of the upper support, and/or limiting the amount of radial expansion of the locking members during sliding, can be desirable to increase efficiency, reduce the amount of stored energy required to move the adjustable saddle post, increase the smoothness of motion of the adjustable saddle post, and/or the like.

Figure 4A:
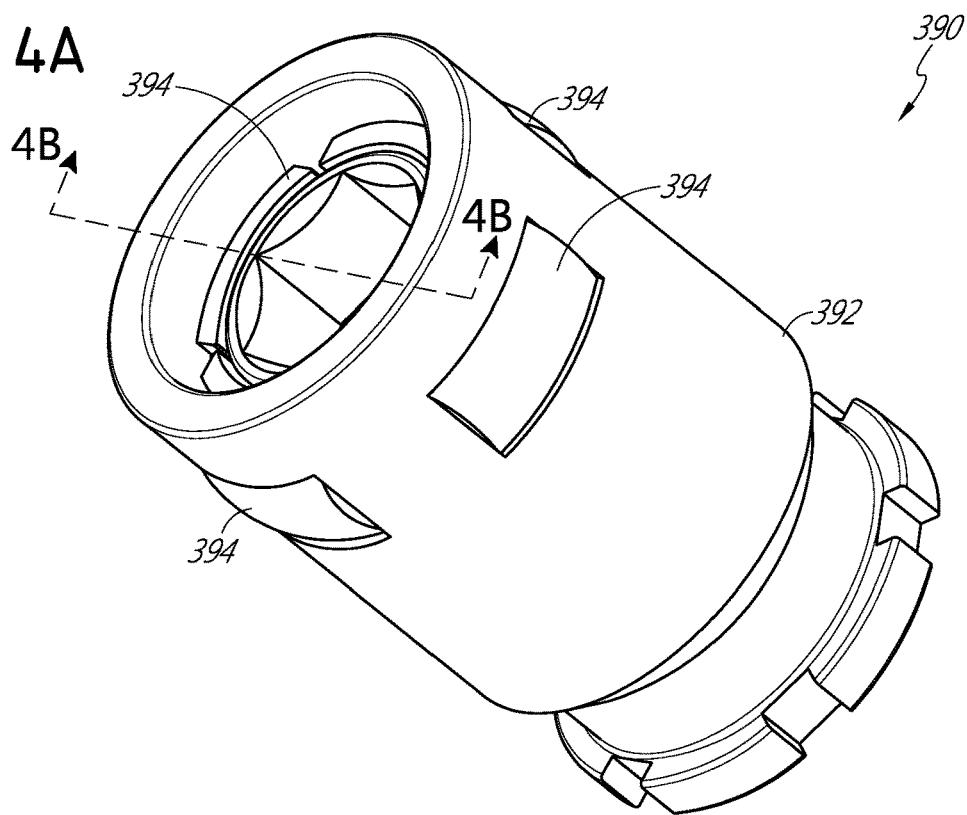
FIGS. 4A and 4B illustrate a perspective view and cross-sectional view, respectively, of an embodiment of a low-friction collet for use with an adjustable height saddle post.
Figure 4B:
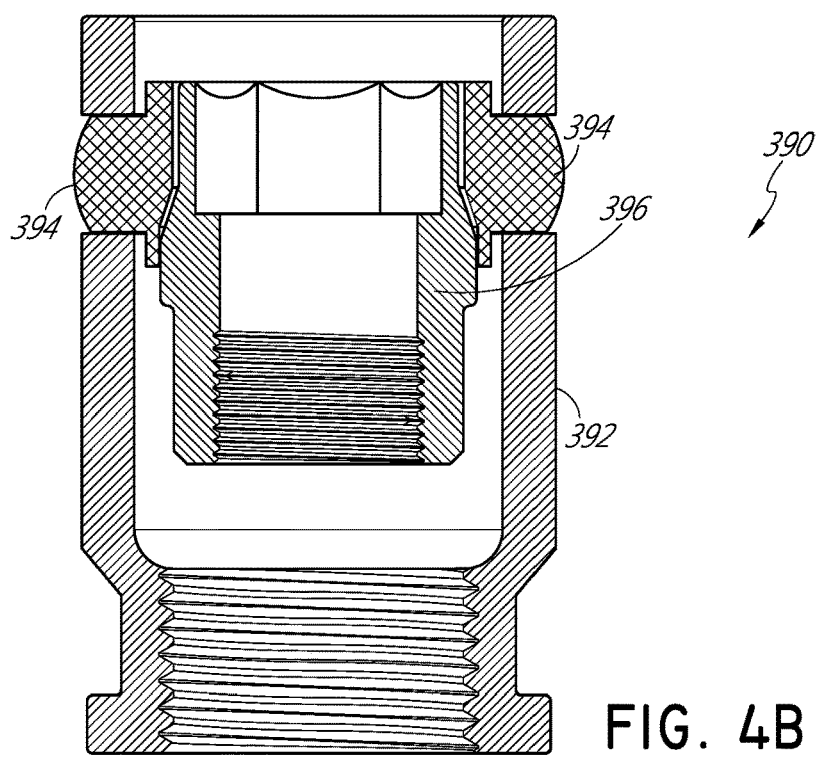

FIGS. 4A and 4B illustrate a perspective view and a cross-sectional view, respectively, of one embodiment of a low friction collet 390, in this case the collet 390 utilized in the fluid powered linear actuator 350 shown in FIGS. 2A-2F and 3. The embodiment of the collet 390 illustrated in FIGS. 4A and 4B comprises a housing 392 with four locking members 394 slidably coupled to the housing 392 such that they can radially expand and contract to selectively engage the collet 390 in a groove of a support. The collet 390 illustrated in FIGS. 4A and 4B may further comprise one or more of the other components illustrated in FIGS. 2A-2F and 3, such as the actuating member 396, to enable selective activation of the collet.

Figure 5H:
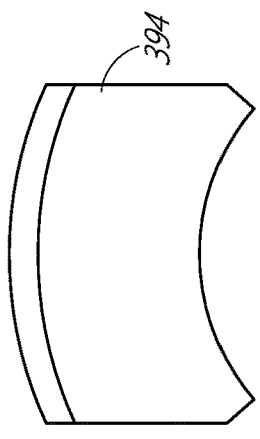
FIGS. 5E-5H illustrate various views of an embodiment of a locking arm for use with the collet body of FIGS. 5A-5D.
Figure 5G:
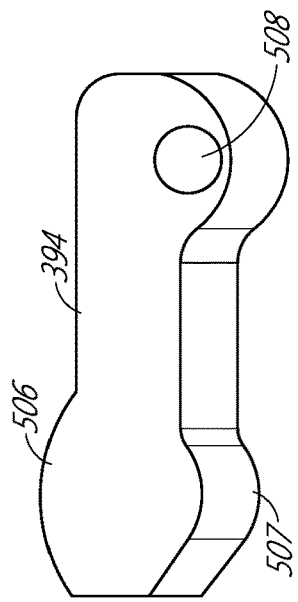
Figure 5E:
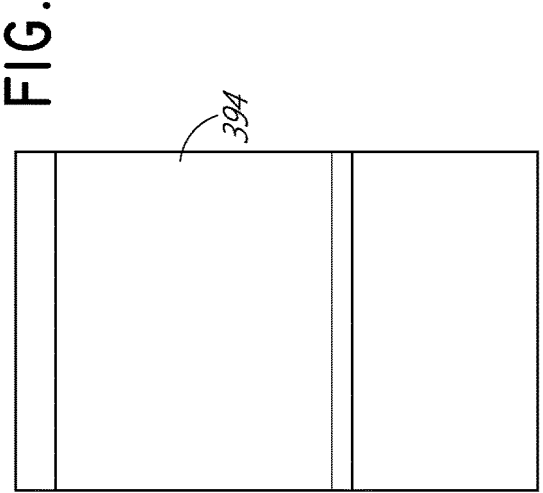
Figure 5F:
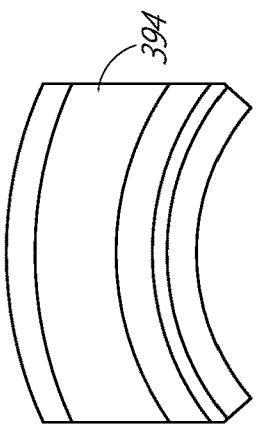

FIGS. 5A-5H depict an alternate embodiment of a low friction collet comprising a housing 392 and three pivotally coupled arms 394. FIGS. 5A-5D depict four views of the housing 392, and FIGS. 5E-5H depict four views of one of the arms 394. The collet design shown in FIGS. 5A-5H is one example of an alternative collet design that could be used with the adjustable height saddle post system illustrated in FIGS. 2A-2F. With reference to FIGS. 5A-5D, the housing 392 comprises three openings 502 for positioning therein of the arms 394. Each of the openings 502 comprises one or more holes 504 for positioning therein of a pivot pin that enables the arms 394 to pivot inwardly and/or outwardly, enabling a locking surface 506 (shown in FIG. 5G) to radially or transversely expand or contract with respect to the body or housing 392. In this embodiment, the locking surface 506 comprises a convex surface shaped and configured to mate with a generally concave groove. In other embodiments, the locking surface 506 may take different forms. As can be seen in FIG. 5G, the locking arms 394 comprise a pivot hole 508 at a proximal end of the arm 394 and the locking surface 506 at a distal end of the arm 394. The distal end of the arm 394 further comprises an activation surface 507 positioned substantially opposite the locking surface 506. The activation surface 507 can be shaped or configured to interact with a cam or similar device, such as the tapered surface 398 of activation member 396 illustrated in FIG. 2E, to enable locking of the arms 394 in an outward orientation.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects, and advantages are necessarily required to practice the present invention. Accordingly, the scope of the present invention is intended to be defined only by the claims that follow.

What is claimed is:

1. An adjustable length post for a bicycle, the adjustable length post comprising:
    a first support and a second support slidably coupled with the first support, the second support comprising an interior cavity defined by an interior surface, the interior surface having a recessed portion recessed from a surrounding surface; and
    a collet coupled to or integrated into the first support, the collet comprising:
        a body positioned at least partially within the interior cavity of the second support;
        a locking member pivotally or slidably coupled to the body, the locking member being repositionable between a locked configuration and an unlocked configuration,
        wherein, in the locked configuration, the locking member protrudes laterally from the body an amount sufficient to engage the recessed portion of the interior surface of the second support, and, in the unlocked configuration, the locking member does not protrude laterally from the body or does not protrude laterally from the body the amount sufficient to engage the recessed portion of the interior surface of the second support;
        an actuating member being positionable to engage an inner surface of the locking member to selectively retain the locking member in the locked configuration; and
        a piston coupled to the second support and configured to cause sliding of the second support with respect to the first support,
        wherein the piston is compliantly coupled to the second support, such that, when the second support is in a fully extended position with respect to the first support, movement of the piston with respect to the first support and the second support causes the actuating member of the collet to retain the locking member in the locked configuration.

2. The adjustable length post of claim 1, wherein the piston is configured to cause sliding of the second support with respect to the first support by at least one of a hydraulic pressure differential, a pneumatic pressure differential, or a mechanical spring force.

3. The adjustable length post of claim 1, wherein the collet comprises a plurality of locking members pivotally or slidably coupled to the body, the plurality of locking members positioned circumferentially around the body of the collet and comprising the locking member.

4. The adjustable length post of claim 1, wherein the locking member comprises:
    an arm pivotally coupled to the body at a proximal end of the arm; and
    an at least partially annular convex surface shaped to engage an annular concave surface of the recessed portion, the at least partially annular convex surface located at a distal end of the arm.

5. The adjustable length post of claim 1, wherein the actuating member is further configured to selectively retain the locking member in the unlocked configuration.

6. The adjustable length post of claim 1, wherein the recessed portion of the interior surface of the second support is positioned to enable locking of the second support with respect to the first support in a fully extended position, and wherein the interior surface further comprises a second recessed portion positioned to enable locking of the second support with respect to the first support in a fully retracted position.

7. An active adjustable height saddle system for a bicycle, the active adjustable height saddle system comprising:
    a first support and a second support slidably coupled with the first support, the first support configured to attach to a bicycle frame or integrated into the bicycle frame, the second support configured to attach to a bicycle saddle;
    a fluid-powered linear actuator comprising a first fluid chamber and a second fluid chamber separated from the first fluid chamber by a piston, wherein the piston is coupled to one of the first support or the second support such that movement of the piston with respect to an other one of the first support or the second support causes the second support to slide with respect to the first support;
    a control valve fluidly coupled to at least one of the first fluid chamber or the second fluid chamber, the control valve configured to selectively enable pressurized fluid to flow from a pressurized fluid source into the at least one of the first fluid chamber or the second fluid chamber to create a pressure differential between the first fluid chamber and the second fluid chamber that causes the movement of the piston; and
    a mechanical locking mechanism configured to be activated by the piston when the second support is at a fully extended position with respect to the first support to maintain the second support in the fully extended position with respect to the first support,
    wherein the control valve is configured to enable fluid-powered sliding of the second support between a first predetermined position and a second predetermined position, and wherein at least one of the first predetermined position or the second predetermined position is defined by a user-repositionable stroke-limiting component that limits sliding of the second support with respect to the first support.

8. The active adjustable height saddle system of claim 7, wherein the control valve is configured to enable fluid-powered sliding of the second support in a retraction direction with respect to the first support.

9. The active adjustable height saddle system of claim 7, wherein the control valve is configured to enable fluid-powered sliding of the second support in both an extension direction and a retraction direction with respect to the first support.

10. The active adjustable height saddle system of claim 9, wherein the control valve is configured to enable pressurized fluid to flow from the pressurized fluid source into the first fluid chamber to enable fluid-powered sliding of the second support in the extension direction, and the control valve is configured to enable pressurized fluid to flow from a second pressurized fluid source into the second fluid chamber to enable fluid-powered sliding of the second support in the retraction direction.

11. The active adjustable height saddle system of claim 7, wherein the control valve is configured to enable fluid-powered sliding of the second support in an extension direction with respect to the first support.

12. The active adjustable height saddle system of claim 7, wherein the fluid-powered linear actuator is selected from one of a pneumatic cylinder or a hydraulic cylinder.

13. The active adjustable height saddle system of claim 7, wherein the fluid-powered linear actuator is positioned substantially within the first support or the second support.

14. The active adjustable height saddle system of claim 7, wherein the piston of the fluid-powered linear actuator seals against an inner surface of the first support or the second support to separate the first fluid chamber and the second fluid chamber.

15. The active adjustable height saddle system of claim 7, wherein the control valve comprises a three-way valve configured to selectively direct pressurized fluid from a single pressurized fluid source to the first fluid chamber or the second fluid chamber, the pressurized fluid source being the single pressurized fluid source.

16. The active adjustable height saddle system of claim 7, wherein the control valve is fluidly coupled to the first fluid chamber to enable selective extension of the second support with respect to the first support, and the active adjustable height saddle system further comprises a second control valve fluidly coupled to the second fluid chamber to enable selective retraction of the second support with respect to the first support.

17. The active adjustable height saddle system of claim 7, wherein the fluid-powered linear actuator comprises a first concentric cylindrical body and a second concentric cylindrical body, wherein a cavity between the first concentric cylindrical body and second concentric cylindrical body is in fluid communication with the first chamber or the second chamber.

18. The active adjustable height saddle system of claim 7, wherein the control valve is configured to selectively seal the first fluid chamber and/or the second chamber to enable the fluid-powered linear actuator to maintain the second support in a substantially fixed position with respect to the first support.

19. The active adjustable height saddle system of claim 7, wherein the mechanical locking mechanism comprises a collet having radially expandable arms configured to engage one or more recessed portions of the first support or the second support.

20. The active adjustable height saddle system of claim 19, wherein the radially expandable arms are pivotally coupled to a body of the collet.

21. An active adjustable height saddle system for a bicycle, the active adjustable height saddle system comprising:
a first support and a second support slidably coupled to the first support, the first support configured to attach to a bicycle frame or integrated into the bicycle frame, the second support configured to attach to a bicycle saddle;
a fluid-powered linear actuator comprising a first fluid chamber and a second fluid chamber separated by a piston, wherein the piston is coupled to one of the first support or the second support such that movement of the piston with respect to an other one of the first support or the second support causes the second support to slide with respect to the first support;
a collet coupled to the other one of the first support or the second support, the collet having radially expandable arms configured to engage one or more recessed portions of the one of the first support or the second support to selectively retain the second support in one or more predetermined positions with respect to the first support; and
an actuating member configured to selectively expand the radially expandable arms to engage the one or more recessed portions,
wherein the piston is compliantly coupled to the one of the first support or the second support, such that, when the second support is in a fully extended position with respect to the first support, movement of the piston with respect to the first support and the second support causes the actuating member to expand the radially expandable arms.

22. The active adjustable height saddle system of claim 21, wherein the radially expandable arms are pivotally coupled to a body of the collet.

23. The active adjustable height saddle system of claim 21, wherein the collet comprise a disengaged configuration wherein the radially expandable arms are sufficiently retracted in a radial direction to not drag against an inner surface of the one of the first support or the second support when the second support slides with respect to the first support.

24. The active adjustable height saddle system of claim 21, wherein the fluid-powered linear actuator is selected from one of a pneumatic cylinder or a hydraulic cylinder.

25. The active adjustable height saddle system of claim 21, further comprising a first port in fluid communication with the first fluid chamber and a second port in fluid communication with the second fluid chamber, the first port and the second port configured to connect to a pressurized fluid supply.

26. The active adjustable height saddle system of claim 21, wherein the fluid-powered linear actuator comprises a first concentric cylindrical body and a second concentric cylindrical body, wherein a cavity between the first body and the second body is in fluid communication with the first fluid chamber or the second fluid chamber.

27. An active adjustable height saddle system for a bicycle, the active adjustable height saddle system comprising:
a first support and a second support slidably coupled with the first support, the first support configured to attach to a bicycle frame or integrated into the bicycle frame, the second support configured to attach to a bicycle saddle;
a fluid-powered linear actuator comprising a first fluid chamber and a second fluid chamber separated from the first fluid chamber by a piston, wherein the piston is coupled to one of the first support or the second support such that movement of the piston with respect to an other one of the first support or the second support causes the second support to slide with respect to the first support;
a control valve fluidly coupled to at least one of the first fluid chamber or the second fluid chamber, the control valve configured to selectively enable pressurized fluid to flow from a pressurized fluid source into the at least one of the first fluid chamber or the second fluid chamber to create a pressure differential between the first fluid chamber and the second fluid chamber that causes the movement of the piston;
wherein the fluid-powered linear actuator comprises a first concentric cylindrical body and a second concentric cylindrical body, wherein a cavity between the first concentric cylindrical body and second concentric cylindrical body is in fluid communication with the first chamber or the second chamber; and
a mechanical locking mechanism coupled to the other one of the first support or the second support and configured to be activated by the piston to maintain the second support in a predetermined position with respect to the first support, the mechanical locking mechanism comprising an actuating member and one or more radially expandable locking members configured to engage one or more recessed portions of the one of the first support or the second support, wherein the actuating member and piston are configured such that, when the second support is in the predetermined position with respect to the first support, movement of the piston in an extend direction with respect to the first support and the second support causes the actuating member to maintain the one or more radially expandable locking members in a radially expanded position.

28. The active adjustable height saddle system of claim 27,
wherein the locking mechanism comprises a collet.

29. The active adjustable height saddle system of claim 28, wherein the radially expandable locking members comprise radially expandable arms that are pivotally coupled to a body of the collet.

* * * * *